(12) United States Patent
Peruch et al.

(10) Patent No.: US 11,203,681 B2
(45) Date of Patent: Dec. 21, 2021

(54) RECYCLABLE CROSS-LINKED DIENE ELASTOMERS COMPRISING FURANYL GROUPS AND PRECURSORS THEREOF

(71) Applicants: UNIVERSITÉ DE BORDEAUX, Bordeaux (FR); INSTITUT POLYTECHNIQUE DE BORDEAUX, Talence (FR); CENTRE NATIONAL DE LA RECHERCHE SCIENTIFIQUE, Paris (FR)

(72) Inventors: Frédéric Peruch, Gradignan (FR); Pierre Berto, Coimeres (FR); Stéphane Grelier, Parentis-en-Born (FR)

(73) Assignees: UNIVERSITÉ DE BORDEAUX, Bordeaux (FR); INSTITUT POLYTECHNIQUE DE BORDEAUX, Talence (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 172 days.

(21) Appl. No.: 16/498,458

(22) PCT Filed: Mar. 29, 2018

(86) PCT No.: PCT/EP2018/058177
§ 371 (c)(1),
(2) Date: Sep. 27, 2019

(87) PCT Pub. No.: WO2018/178282
PCT Pub. Date: Oct. 4, 2018

(65) Prior Publication Data
US 2020/0109270 A1    Apr. 9, 2020

(30) Foreign Application Priority Data

Mar. 31, 2017 (EP) .................................. 17305389

(51) Int. Cl.
C08C 19/04       (2006.01)
C08L 19/00       (2006.01)
(Continued)

(52) U.S. Cl.
CPC .............. C08L 19/006 (2013.01); C08J 3/24 (2013.01); *C08C 19/04* (2013.01); *C08C 19/22* (2013.01); *C08C 19/38* (2013.01); *C08J 2319/00* (2013.01)

(58) Field of Classification Search
CPC . C08C 19/04; C08C 19/22; C08F 8/06; C08F 8/30; C08F 2810/40
See application file for complete search history.

(56) References Cited

U.S. PATENT DOCUMENTS 4,687,812 A * 8/1987 Dickie .................... C08G 59/02
                                                            525/111
10,280,130 B2 * 5/2019 Kennedy ................. C07C 29/72
(Continued)

FOREIGN PATENT DOCUMENTS

| CN | 101955592 A | 1/2011 |
| JP | 2014-084413 A | 5/2014 |
| JP | 2016-108434 A | 6/2016 |

OTHER PUBLICATIONS

Swanson, Macromolecules, 2010, 43, 6135-6141 (Year: 2010).*
(Continued)

*Primary Examiner* — Robert C Boyle
(74) *Attorney, Agent, or Firm* — Nixon & Vanderhye

(57) ABSTRACT

Disclosed are new precursors of recyclable cross-linked diene elastomers including chain-end units with furanyl groups, their use in the preparation of the recyclable elastomers and their process of preparation. Also disclosed are new recyclable cross-linked diene elastomers, their preparation process and their uses.

20 Claims, 9 Drawing Sheets

(51) Int. Cl.
  *C08J 3/24* (2006.01)
  *C08C 19/22* (2006.01)
  *C08C 19/38* (2006.01)

(56) References Cited

U.S. PATENT DOCUMENTS

2002/0086952 A1* 7/2002 Chino .................. B60C 1/00
                                           525/327.6
2010/0099798 A1* 4/2010 Costanzo ............ C06B 23/009
                                           523/180

OTHER PUBLICATIONS

International Search Report, dated Jul. 13, 2018, from corresponding PCT application No. PCT/EP2018/058177.
Swanson et al.; Development of Polymeric Phase Change Materials on the basis of Diels-Alder Chemistry Macromolecules; Jul. 27, 2010; pp. 6135-6141; vol. 43, No. 14.

* cited by examiner

RECYCLABLE CROSS-LINKED DIENE ELASTOMERS COMPRISING FURANYL GROUPS AND PRECURSORS THEREOF

The present invention concerns new precursors of recyclable cross-linked diene elastomers, their use in the preparation of said recyclable elastomers and their process of preparation. The invention also concerns new recyclable cross-linked diene elastomers, their preparation process and their uses.

In 2015, the total rubber production was over 26 millions of tons. Natural and synthetic rubbers like polyisoprene, polyethylene/propylene/diene (EPDM) or polybutadiene (PB) are widely used in many areas like automotive, sport equipment, building materials or tires. Their elasticity, strength, high moduli or solvent resistance are the main properties expected for these materials. To reach these properties, the rubber has to be chemically cross-linked. Sulfur vulcanization and peroxide curing are currently the main methods used in industry. However, the network produced by these pathways is irreversibly cross-linked. As a consequence, the material cannot be correctly recycled and leads to important quantities of wastes.

Recently, new routes to synthesize reversible cross-linked materials were investigated. Among reversible reactions, the Diels-Alder (DA) reaction has already been tested on a wide range of polymers like polyurethane, epoxy or recently on polybutadiene to create reversible network. One of the most popular DA reaction involves a furan and a maleimide leading to an adduct that can dissociate under thermal treatment with few side reactions in mild reaction conditions.

The thiol-ene reaction is used to graft furanyl groups along a polybutadiene chain. The bis-maleimide, used as the cross-linking agent, is then added to the modified elastomer to form a thermosensitive dynamic network. However, several disadvantages have to be considered with the thiol-ene reaction: some side reactions like cyclization or uncontrolled cross-linking can occur. Moreover, the molar mass of the polybutadiene used is high, comprised between 135 and 200 kg·mol$^{-1}$, increasing solubilization time, washing steps and complicating chemical characterization or molding due to this high viscosity.

There is thus a need to provide new precursors for the preparation of recyclable cross-linked diene elastomers and new recyclable cross-linked diene elastomers thereof. In particular, there is a need to provide precursors of recyclable cross-linked diene elastomers which can be easily and efficiently obtained and used in the industry, and especially having a low viscosity.

The aim of the present invention is to provide new compounds, in particular useful as precursors for the preparation of recyclable cross-linked diene elastomers.

A particular aim of the invention is to provide precursors for the preparation of recyclable cross-linked diene elastomers having a low viscosity and which are easy to use in said preparation process.

An aim of the invention is to provide a process of preparation of such precursors.

Another aim of the invention is to provide new recyclable cross-linked diene elastomers, in particular recyclable polybutadiene, polyisoprene, and polychloroprene.

A particular aim of the invention is to provide new thermoreversible cross-linked to diene elastomers.

Another aim of the invention is to provide a process of preparation of said recyclable cross-linked diene elastomers.

The present invention thus concerns a compound having the following formula (I):

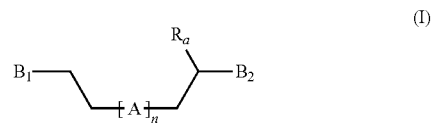

wherein:
n is an integer comprised between 10 and 2 000, preferably between 15 and 1 500;
$R_a$ is selected from the group consisting of: H, linear or branched $(C_1\text{-}C_5)$alkyl, and halogen atom;
A comprises at least one repeating unit (U) having the formula (U1) or (U2):

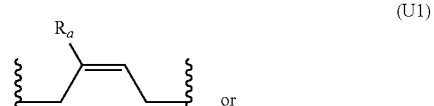

with $R_a$ being as defined above and $R_{a''}$ being selected from the group consisting of H, —CH—CH$_2$, and —C(=CH$_2$)($R_a$), $R_a$ being as defined above;
$B_1$ and $B_2$, independently of each other, have the following formula (B):

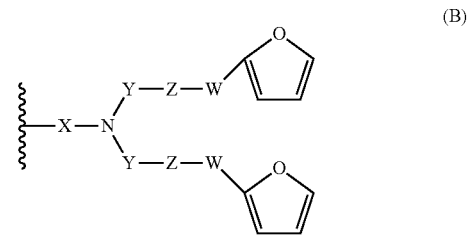

or the following formula (C):

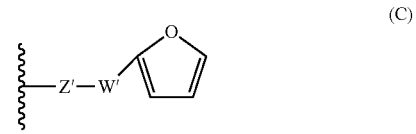

wherein at least one of $B_1$ and $B_2$ has the formula (B), and wherein:
—X is:
a bond or
a group of formula —NH—X$_1$—, wherein X$_1$ is a linear or branched $(C_1\text{-}C_5)$alkylene group;
Y is selected from the linear and branched $(C_1\text{-}C_5)$ alkylene groups;

Z and Z' are independently of each other —O— or —NH—;

W and W' are independently of each other selected from the group consisting of: —C(=O)—NH—Y'—, —C(=O)—Y'—, and —Y'— groups, Y' representing a linear or branched $(C_1\text{-}C_5)$alkylene group, preferably a $(C_1\text{-}C_3)$alkylene group.

The present inventors surprisingly synthesized well-defined thermoreversible cross-linked diene elastomers by using easy and efficient chemistry for chain-ends modifications, in particular by using chain-ends units comprising furanyl groups in their precursors.

More particularly, the inventors discovered new precursors of said elastomers by first degrading commercial high molar mass diene elastomers into polymers with lower molar masses, leading to a significant decrease of the viscosity of the polymers. For example, the molar mass of the degraded commercial elastomers, in particular of degraded commercial polybutadiene, ranges to from 1 000 g·mol$^{-1}$ to 50 000 g·mol$^{-1}$, preferably from 1 000 g·mol$^{-1}$ to 25 000 g·mol$^{-1}$, and more particularly from 5 000 g·mol$^{-1}$ to 20 000 g·mol$^{-1}$.

From these polymers, furanyl telechelic precursors were prepared, with various chain lengths. The addition of a cross-linking agent to these precursors surprisingly yields to various cross-linked diene elastomers.

According to the invention, the cross-linking is thermoreversible: the diene elastomers of the invention are in particular usable in a temperature range comprised between −70° C. and +80° C., preferably between −40° C. and +80° C. without losing their mechanical properties.

Moreover, the cross-linked diene elastomers of the invention surprisingly keep their mechanical properties after several remolding cycles, for example after 1 to 5 cycles of remolding.

The present inventors also surprisingly discovered that higher chain length of the precursors of the invention, for example with n as defined above being comprised between 300 and 500, reduces the Young and elastic moduli with high elongation at break, whereas shorter chain length of the precursors, for example with n as defined above being comprised between 30 and 80, reduces the elongation at break but increases the Young and elastic moduli.

Lastly, it was discovered that the mechanical properties of the diene elastomers network can be tuned by monitoring the quantity of the cross-linking agent used in their preparation process.

Definitions

By "mechanical properties", it may be meant the elasticity, in particular characterized by the elastic modulus and the loss modulus, the young modulus, the maximum stress at break and the maximum strain at break.

By "low viscosity", it is meant a viscosity comprised between 0.1 and 3000 Pa·s.

The term "$(C_1\text{-}C_5)$alkyl" means a saturated aliphatic hydrocarbon group which may be straight or branched having from 1 to 5 carbon atoms in the chain (i.e. an alkane missing one hydrogen atom).

The term "$(C_1\text{-}C_{10})$alkyl" means a saturated aliphatic hydrocarbon group which may be straight or branched having from 1 to 10 carbon atoms in the chain (i.e. an alkane missing one hydrogen atom).

Preferred alkyl groups are methyl, ethyl, propyl or isopropyl groups, more particularly methyl groups. "Branched" means that one or lower alkyl groups such as methyl, ethyl or propyl are attached to a linear alkyl chain.

The term "$(C_1\text{-}C_5)$alkylene" means a saturated aliphatic hydrocarbon divalent group which may be straight or branched having from 1 to 5 carbon atoms in the chain (i.e. an alkane missing two hydrogen atoms).

The term "$(C_1\text{-}C_{20})$alkylene" means a saturated aliphatic hydrocarbon divalent group which may be straight or branched having from 1 to 20 carbon atoms in the chain. (i.e. an alkane missing two hydrogen atoms).

Preferred alkylene groups are methylene, ethylene or propylene groups. "Branched" means that one or lower alkylene groups such as methylene, ethylene or propylene are attached to a linear alkylene chain.

By "$(C_3\text{-}C_6)$cycloalkyl" is meant a cyclic, saturated hydrocarbon group having 3 to 6 carbon atoms, wherein any ring atom capable of substitution may be substituted by a substituent. Preferred cycloakyl groups are cyclopropyl or cyclobutanyl groups, preferably not substituted.

The term "3-6 membered heterocyclyl" refers to a saturated monocyclic hydrocarbon ring system comprising from 3 to 6 carbon atoms, wherein any ring atom capable of substitution may be substituted by a substituent, for example (=O) or ClSO$_2$, and wherein one or more carbon atom(s) are replaced by one or more heteroatom(s) such as nitrogen atom(s), oxygen atom(s) and sulfur atom(s); for example 1 or 2 nitrogen atom(s), 1 or 2 oxygen atom(s), 1 or 2 sulfur atom(s) or a combination of different heteroatoms such as 1 nitrogen atom and 1 oxygen atom. Preferred heterocyclyl groups are epoxydyl, azetidinyl and dihydrofuran-2,5-dionyl groups. More particularly, the heterocyclyl group is an epoxydyl group.

By a "trivalent linear or branched $(C_1\text{-}C_{10})$alkane" is meant a saturated aliphatic hydrocarbon group having from 1 to 10 carbon atoms and missing three hydrogen atoms, with the terms "linear" or "branched" as defined for the alkyl groups. For example, R' is a trivalent $(C_1\text{-}C_{10})$alkane in formula (VIII) and is thus an alkane linked to the three nitrogen atoms of formula (VIII).

By a "trivalent $(C_6\text{-}C_{10})$arene", is meant an aromatic monocyclic, bicyclic, or tricyclic hydrocarbon ring system comprising from 6 to 10 carbon atoms and missing three hydrogen atoms. For example, R' is a trivalent $(C_6\text{-}C_{10})$arene in formula (VIII) and is thus an arene linked to the three nitrogen atoms of the compounds of formula (VIII).

The term "halogen" refers to the atoms of the group 17 of the periodic table and includes in particular fluorine, chlorine, bromine, and iodine atoms, more preferably fluorine, chlorine and bromine atoms. In a particular embodiment, the halogen is the chlorine atom.

All diastereoisomeric forms (cis and trans; Z and E) and all geometric isomeric forms of the compounds and polymers of the invention are intended, unless the diastereoisomeric or the isomeric form is specifically indicated.

Precursors of General Formula (I)

By "precursors", "precursors of the invention" or "precursors of the recyclable cross-linked diene elastomers", it is meant compounds of formula (I) as described above.

In one embodiment, the precursors of formula (I) do not comprise a sulfur atom.

According to one embodiment, the precursors of formula (I) comprise at least two repeating units (U). In one preferred embodiment, A consists of repeating units (U). In one embodiment, the repeating units (U) are identical. In another embodiment, A comprises at least one unit (U1) and at least one unit (U2), preferably A consists of repeating units (U1)

and (U2). In another embodiment, A comprises at least two units (U1) and at least two units (U2).

In one embodiment, the repeating unit (U) is of formula (U1):

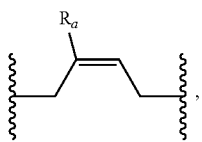
(U1)

with $R_a$ as defined above.

In another embodiment, the repeating units (U) are selected from the group consisting of:

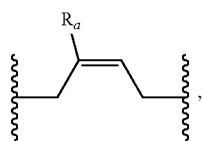
(U')

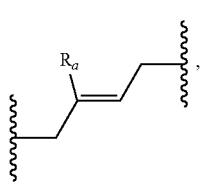
(U")

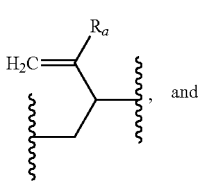
(U'''), and

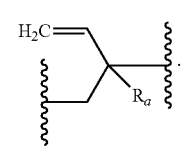
(U'''').

$R_a$ being as defined above, and wherein (U') and (U") correspond respectively to the cis and trans isomers of formula (U1).

In one embodiment, when X is a bond, then Z is —O—, and when X is —NH—$X_1$—, then Z is —NH—.

In another embodiment, $B_1$ is of formula (B) as defined above and $B_2$ is either of formula (B) or of formula (C) as defined above.

In one embodiment, Z and Z' are identical and W and W' are also identical (in this case, one of $B_1$ and $B_2$ is of formula (B) and the other is of formula (C).

In one embodiment, A further comprises at least one repeating unit (V) having the following formula:

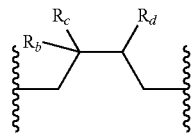
(V)

wherein:
$R_b$ is selected from the group consisting of: H, OH, $(C_1-C_5)$alkyl, and halogen atom;
$R_c$ is H or an halogen atom, or $R_b$ and $R_c$ form together with the carbon atom carrying them a —C=$CH_2$ group;
$R_d$ is selected from the group consisting of: H, OH, —S—C(=O)—$R_g$, —S—C(=S)—$R_g$, —P(=O)(OR$_g$)$_2$, —B($R_g$)$_2$, dihydrofuran-2,5-dionyl, and $CX'_2R_f$,
X' being a halogen atom,
$R_f$ being selected from the group consisting of halogen atom, $CH_3$—C(=O)—O—$(C_1-C_{10})$alkyl, —P(=O)(Hal)$_2$ with Hal being an halogen atom,
$R_g$ being a linear or branched $(C_1-C_{10})$alkyl group,
or $R_c$ and $R_d$ form together with the carbon atoms carrying them a $(C_3-C_6)$cycloalkyl or a 3-6 membered heterocyclyl group, said cycloalkyl and heterocyclyl groups being optionally substituted;
the percentage of the number of repeating units (V) being inferior or equal to 80% of the number of repeating units (U), preferably inferior or equal to 50% of the number of repeating units (U).

By "optionally substituted", it may be meant that said cycloalkyl and heterocyclyl groups are optionally substituted by one or more substituent(s) selected from the group consisting of: $(C_1-C_5)$alkyl, halogen atom, (=O) and —$SO_2Cl$, preferably (=O) and —$SO_2Cl$.

In one embodiment, Rb is H or OH, Rc is H and Rd is H or OH; or $R_c$ and $R_d$ form together with the carbon atoms carrying them an oxirane group.

In one embodiment, the percentage of the number of repeating units (V) is inferior or equal to 10%, based on the number of repeating units (U).

In a particular embodiment, the repeating units (V) are identical and are preferably selected from the group consisting of:

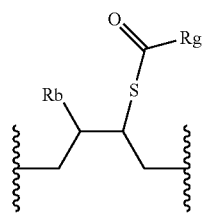
(V1)

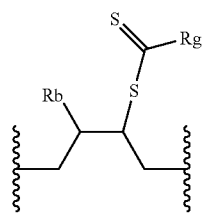
(V2)

-continued

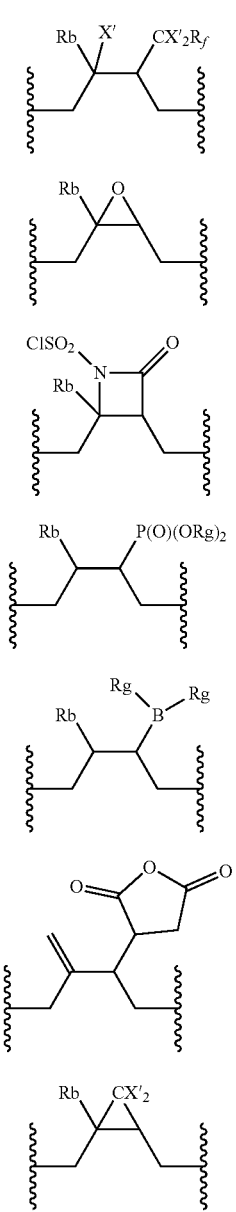

(V3)

(V4)

(V5)

(V6)

(V7)

(V8)

(V9)

wherein $R_b$, X', $R_f$ and $R_g$ are as defined above.

In one particular embodiment, the repeating units (V) are identical and are selected from (V4), (V7), and (V8), with $R_b$ and $R_g$ as defined above. In a preferred embodiment, the repeating units (V) are of formula (V4), with $R_b$ as defined above, preferably with $R_b$ being H.

In one embodiment, A consists of repeating units (U) or consists of repeating units (U) and (V) as defined above. In one embodiment, when A further comprises at least one repeating unit (V), then the repeating units (U) are of formula (U1).

In one embodiment, $R_a$ is H or a ($C_1$-$C_5$)alkyl group, preferably $R_a$ is H or $CH_3$. In a particular embodiment, $R_a$ is H. In one embodiment, $R_{a'}$ is H.

In one embodiment, Z is —O— and W is —C(=O)—NH—Y'—, Y' being preferably a —$CH_2$— group. In one embodiment, Z' is —O— and W' is —C(=O)—NH—Y'—, Y' being preferably a —$CH_2$— group.

In one embodiment, W is —C(=O)—NH—Y', Y' being preferably a —$CH_2$— group.

In one embodiment, X is a bond or a —NH—$(CH_2)_2$— group, preferably a bond.

In one embodiment, Y is a —$(CH_2)_2$—, —$(CH_2)_3$— or a —$CH_2$—CH($CH_3$)— group, preferably a —$(CH_2)_2$— group.

In a particular embodiment, the compound of formula (I) has the following formula (Ia):

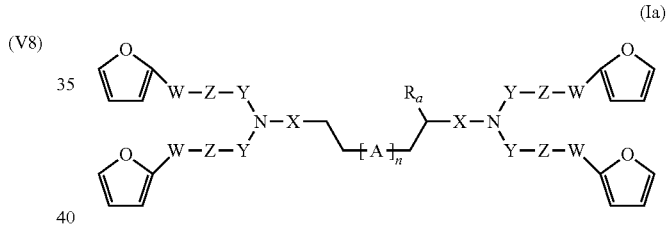

(Ia)

wherein n, $R_a$, A, X, Y, Z and W are as defined herein. Preferably $R_a$ is H, $CH_3$ or Cl.

The compound of formula (Ia) corresponds to a compound of formula (I) wherein $B_1$ and $B_2$ are of formula (B).

The invention also concerns compounds having one of the following formulae:

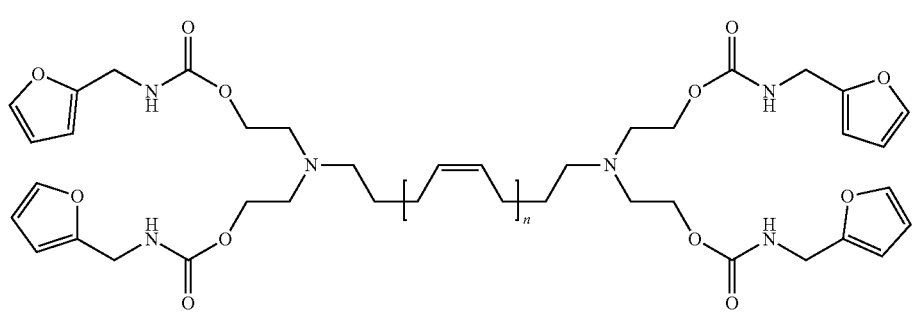

a

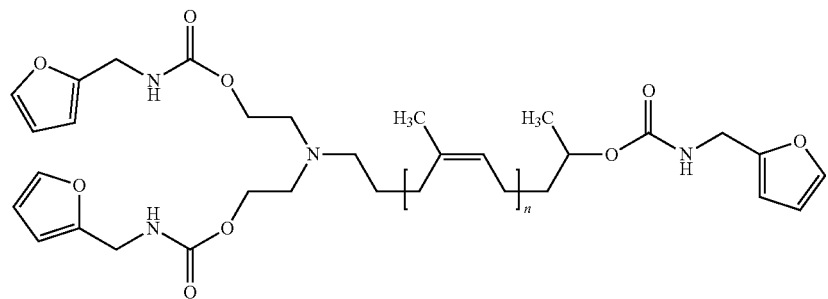

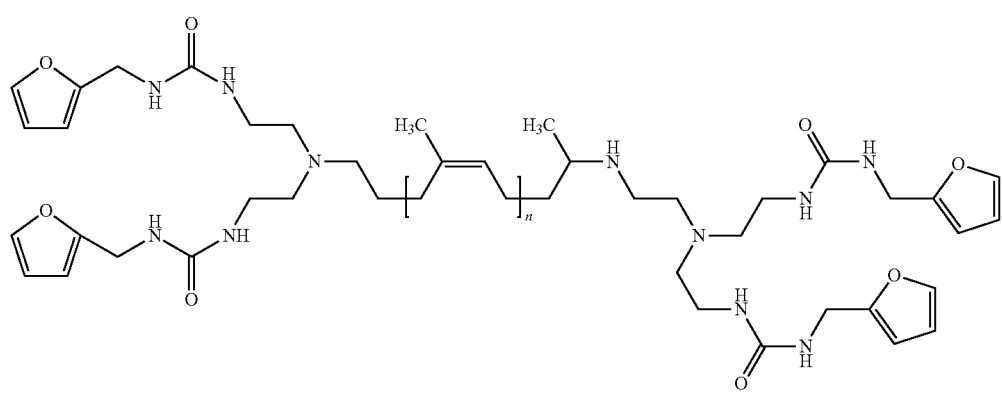

wherein n is as defined above.

Process for the Preparation of the Precursors of General Formula (I)

The invention also relates to a process for the preparation of a compound of formula (I), in particular when the repeating units have the formula (U1), as defined above, comprising the following steps:

a) a reductive amination step comprising the reaction of an aldehyde of formula (II):

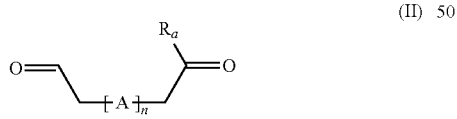

with at least one amine of formula (III):

with n, $R_a$, A, X, Y, and Z being as defined above, in order to obtain a compound having the following formula (IV):

with n, $R_a$ and A being as defined above, and wherein $B_1'$ and $B_2'$, independently of each other, have the formula (B'):

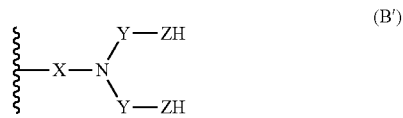

or form with the carbon atom carrying them a —C=O group, and wherein at least one of $B_1'$ and $B_2'$ is of formula (B');

b) optionally, if one of $B_1'$ and $B_2'$ forms with the carbon atom carrying it a —C=O group, a reduction step comprising the reaction of the compound of formula (IV) as defined above with a reducing agent, for example NaBH$_4$, in order to obtain a compound having the formula (IV'):

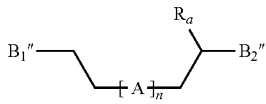
(IV')

with n, R$_a$ and A being as defined above, and wherein B$_1$" and B$_2$", independently of each other, have the formula (B'):

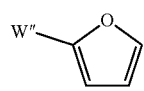
(B')

or —OH, and wherein at least one of B$_1$" and B$_2$" is of formula (B');

c) the reaction of the compound of formula (IV) or (IV') with at least one functionalized furane having the following formula (VI):

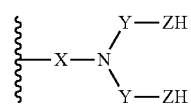
(VI)

wherein W'" is independently chosen from the group consisting of: —Y—N═C═O, —Y'—C(═O)—Cl, —Y'—C(═O)—OH, —Y'—C(═O), and —Y'-Hal, Y' being as defined above and Hal being an halogen atom;

in order to obtain a compound having the formula (I).

In a particular embodiment, the reductive amination step a) comprises the reaction of an aldehyde of formula (II):

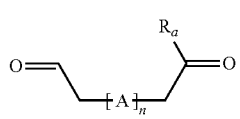
(II)

with two amines of formula (III):

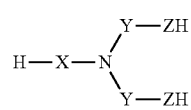
(III)

n, R$_a$, A, X, Y, and Z being as defined above, in order to obtain a compound having the following formula (IVa):

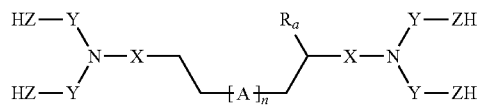
(IVa)

then, the reaction of the compound of formula (IVa) with four functionalized furane groups having the following formula (VI):

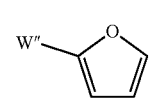
(VI)

wherein W'" is independently chosen from the group consisting of: —Y'—N═C═O, —Y'—C(═O)—Cl, —Y'—C(═O)—OH, —Y'—C(═O), and —Y'-Hal, Y' being as defined above and Hal being an halogen atom;

leads to a compound having the formula (Ia).

Advantageously, the aldehyde of formula (II) according to the invention may be obtained by a degradation step of commercial polymers, in particular polymers having a high molar mass, for example comprised between 100 000 and 500 000 g·mol$^{-1}$. Among these commercial polymers, it may be cited the polybutadiene, the polyisoprene or the polychloroprene. This degradation step is well-known in the art. For example, the degradation step may be performed by an epoxidation step of said commercial polymers, followed by a cleavage of the oxirane groups, in particular by periodic acid.

The operating conditions of the above-mentioned steps a), b) and c) are known in the art.

The reductive amination (step a)) may be performed in the presence of an organic solvent such as tetrahydrofurane, dichloromethane, dichloroethane, tetrachloroethane, chloroform, toluene, diethyl ether, ethyl acetate, cyclohexane, or their mixtures; preferably tetrahydrofurane. The reductive amination (step a)) may be performed at temperature range of −20° C. to 50° C., more particularly at a range of 20 to 25° C.

The addition of the functionalized furane (step c)) may be performed in the presence of an organic solvent such as dichloromethane, dichloroethane, tetrachloroethane, chloroform, toluene, diethyl ether, ethyl acetate, cyclohexane, or their mixtures; preferably tetrahydrofurane.

The addition of the functionalized furane (step c)) may be performed at a temperature range of −20° C. to 50° C., more particularly at a range of 25 to 35° C. In one embodiment, it is performed in the presence of a catalyst such as dibutyltindilaurate, preferably in a molar ratio of 0.1% to 10% compared to the compound VI for example in a range of 2% to 5%.

The above-mentioned steps a) and c) may be performed at a temperature comprised between 20° C. and 60° C., for example about 40° C., preferably under inert atmosphere.

In one embodiment, some of the units (U1) may be later functionalized according to known methods, to obtain the precursors of formula (I) and/or the polymers of the invention comprising the units (V) as defined above.

The invention further relates to a compound having the following formula (IV):

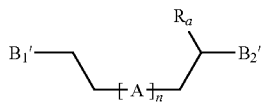

(IV)

wherein n, $R_a$, A, $B_1'$ and $B_2'$ are as defined above.

The compounds of formula (IV) are intermediate compounds in the preparation of the precursors of formula (I).

In one embodiment, said compound of formula (IV) has the following formula:

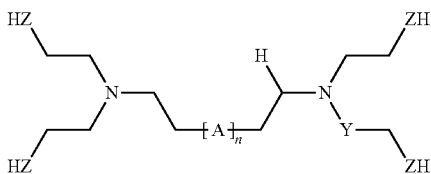

wherein A, n and Z are as defined above.

Polymers Obtained from the Precursors of General Formula (I)

The invention relates to a polymer, preferably a recyclable polymer, susceptible to be obtained by the reaction of a compound of formula (I) as defined above, with a crosslinking agent comprising at least two maleimidyl groups.

In a particular embodiment, the ratio cross-linking agent/precursors of formula (I) is comprised between 0.1 and 1, preferentially between 0.5 and 1.

In one embodiment, the crosslinking agent has the following formula (VII):

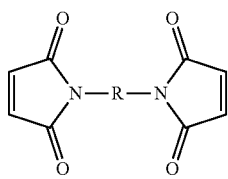

(VII)

wherein R is chosen from the group consisting of:
- a linear or branched $(C_1-C_{20})$alkylene, said alkylene being optionally interrupted by one or more heteroatom(s), such as O or S;
- a phenylene, said phenylene being optionally substituted by one or more substituent(s) selected from $(C_1-C_{10})$alkyl, preferably by one or more methyl group(s); and
- a phenylene-L-phenylene group, with L being selected from the group consisting of: a bond, a $(C_1-C_6)$alkylene, —O— and —$SO_2$—.

In a particular embodiment, the crosslinking agent is selected from the group consisting of: 1,1'-(methylenedi-4,1-phenylene)bismaleimide, N,N'-(4-methyl-1,3-phenylene) bismaleimide, 1,1'-(3,3'-dimethyl-1,1'-bisphenyl-4,4'diyl) bismaleimide, N,N',-(1,3-phenylene)bismaleimide, N,N',-(1,4-phenylene)bismaleimide, N,N'-(1,2-phenylene) bismaleimide, dithio-bis-maleimidoethane, 1,11-bismaleimido-triethyleneglycol, 4,4'-oxybis(methylbenzene)bismaleimide.

Preferably, said crosslinking agent is the 1,1'-(methylenedi-4,1-phenylene)bismaleimide, having the following formula:

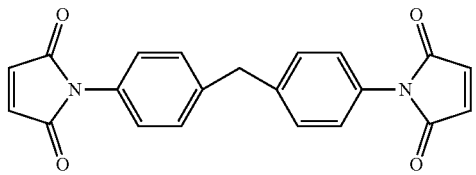 [SMILES: O=C1C=CC(=O)N1c1ccc(Cc2ccc(N3C(=O)C=CC3=O)cc2)cc1]

According to an embodiment, the crosslinking agent has the following formula (VIII):

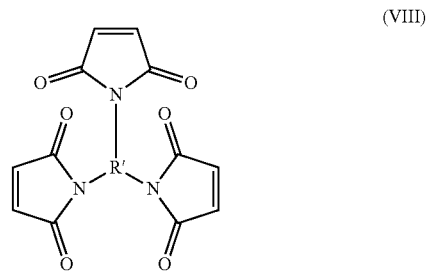

(VIII)

wherein R' is chosen from the group consisting of: a trivalent $(C_1-C_{10})$alkane, or a trivalent $(C_6-C_{10})$arene, preferably a trivalent methane or a trivalent benzene.

The present invention also relates to a process of preparation of a polymer comprising the reaction of a compound of formula (I) as defined above, with a crosslinking agent comprising at least two maleimidyl groups as defined above. The invention relates to a polymer obtained by said process of preparation. The invention relates to the use of the compound of formula (I), for the preparation of a polymer.

In particular, the polymers of the invention are elastomers, preferably recyclable elastomers. Indeed, said elastomers can undergo from 1 to 5 remolding cycles without any loss of their mechanical properties.

The remolding step can be performed by the dissolution of said elastomer in an organic solvent such as chloroform, dichloroethane, tetrachloroethane, toluene, tetrahydrofurane, preferably chloroform. In one embodiment, said remolding step is performed at a temperature comprised between 100° C. and 150° C., for example comprised between 110° C. and 130° C., such as 120° C.

The invention also relates to the use of the polymers and/or elastomers as defined above in tires, rubber seals, automotives, and buildings. In particular embodiment, said polymers and/or elastomers as defined above may be used in a temperature range comprised between −70° C. and +80° C., preferably between −40° C. and +80° C.

EXAMPLES

Figure 1A:
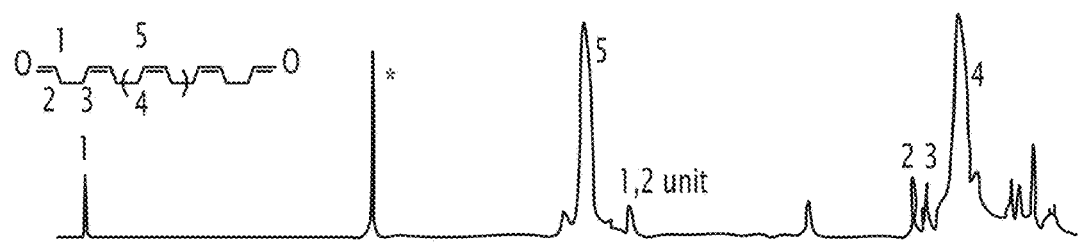
FIG. 1A: $^1$H NMR spectrum of the aldehyde telechelic polybutadiene of formula (II).

Example 1: Synthesis of Precursors of Formula (I) According to the Invention

The compound 4, corresponding to a precursor of formula (I) of the invention, is prepared according to the following scheme 1:

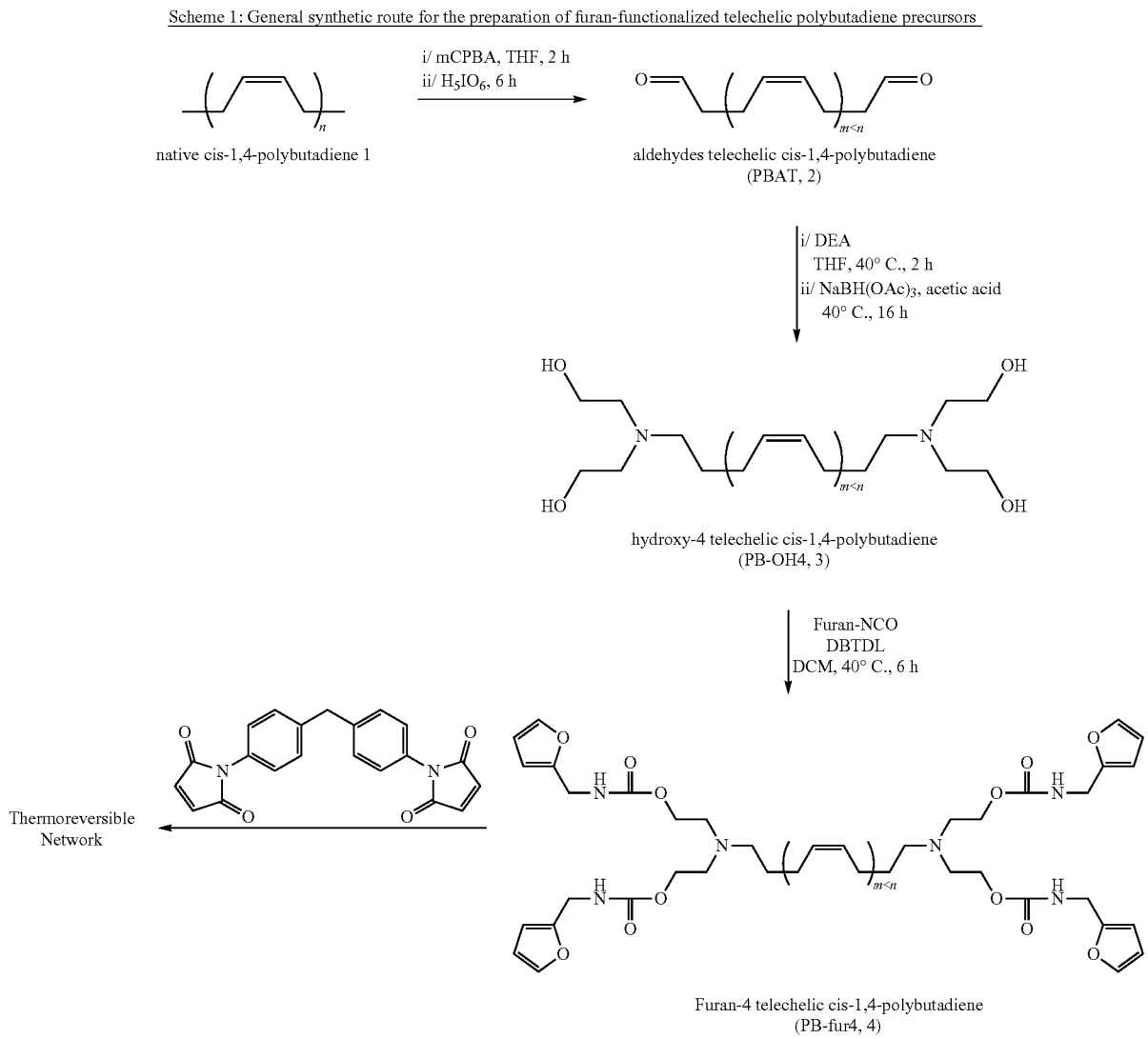

Scheme 1: General synthetic route for the preparation of furan-functionalized telechelic polybutadiene precursors

1.1. Materials

Cis-1,4-polybutadiene (1, cis-1,4-PB, 98% cis-1,4, $M_n$=150 kg·mol$^{-1}$, Đ=2.8) was purchased from Scientific Polymer Products, Inc. 3-Chloroperoxybenzoic acid (mCPBA, 70-75%, Acros), periodic acid ($H_5IO_6$, ≥99%, Aldrich), acetic acid (99%, Aldrich), sodium triacetoxyborohydride (NaBH(OAc)$_3$, 97%, Aldrich), diethanolamine (DEA, 99%, Alfa Aesar), furfuryl isocyanate (Furan-NCO, 97%, Aldrich), 1,1'-(methylenedi-4,1-phenylene)bismaleimide (Bismaleimide, 95%, Alfa Aesar), celite 545 (VWR), dibutyltin dilaurate (DBTDL, 95%, TCI) were used without further purification. Tetrahydrofuran (THF) and dichloromethane (DCM) were dried on alumina column. Chloroform (CHCl$_3$), methanol and diethyl ether (reagent grade, Aldrich) were used as received.

1.2. Polybutadiene Chemical Modifications

1.2.1. Synthesis of Aldehyde Telechelic Cis-1,4-polybutadiene (2, ATPB), Compound of Formula (II) of the Invention High molar mass cis-1,4-polybutadiene 1 was first epoxidized with a given molar ratio of mCPBA/butadiene (BD) units, followed by subsequent one-pot cleavage of oxirane units by adding periodic acid as described in the literature. A typical reaction procedure is as follows. mCPBA (300 mg, 1.25 mmol) dissolved in 10 mL of THF was added dropwise to a solution of cis-1,4-polybutadiene (3.22 g, 59.6 mmol of BD units) in 80 mL of THF at 0° C. After 2 h of reaction at room temperature, periodic acid (1.05 eq. compared to mCPBA, 342 mg) dissolved in 10 mL of THF were added dropwise and stirred during 2 h at room temperature. The solvent was then removed under reduced pressure and the crude product was dissolved in diethyl ether before filtration on celite to removed insoluble iodic acid. The filtrate was then concentrated before washing 2 times with saturated solution (30 mL of each) of Na$_2$S$_2$O$_3$, NaHCO$_3$ and distilled water. Finally, the organic layer was dried (MgSO$_4$), filtered on celite and the solvent was evaporated to dryness to obtain a yellow liquid 2. $M_{n\ (NMR)}$=5 300 g·mol$^{-1}$, $M_{n\ (SEC)}$=5 750 g·mol$^{-1}$, Đ=1.9, yield: 90%.

1.2.2. Synthesis of Hydroxy-4 Telechelic Cis-1,4-polybutadiene (3, PB—OH$_4$), Compound of Formula (IV) of the Invention ATPB 2 (1.71 g, 0.68 mmol aldehyde) dissolved in 8.5 mL of dry THF and 3 eq of DEA (21.5 mg, 2.04 mmol) were mixed and stirred at 40° C. during 2 h under inert atmosphere. 3 eq of NaBH(OAc)$_3$ (433 mg, 2.04 mmol) and 1.2 eq of acetic acid were added to the solution and stirred at 40° C. overnight under inert atmosphere. After concentration, the product was purified by precipitation/dissolution in methanol/DCM several times and dried under vacuum to obtain a colorless liquid 3. Yield=88%.

1.2.3. Synthesis of Furan-4 Telechelic Cis-1,4-polybutadiene (4, PB-fur$_4$), Precursors of Formula (I) of the Invention PB—OH$_4$ 3 (1.37 g, 1.09 mmol hydroxyl groups) was dissolved in 6.5 mL of dry DCM. 1.5 eq of furan-NCO (176 µl, 1.64 mmol) and 5% mol of DBTDL (32 µl, 55 µmol) were added to the solution and stirred at 40° C. during 6 h under inert atmosphere. After concentration, the product was purified by precipitation/dissolution in methanol/DCM several times and dried in vacuum to obtain a brown liquid 4. Yield=91%.

1.2.4 Synthesis of Furan-4 Telechelic Cis-1,4-polybutadienes of Formula (I) with Various Chain Lengths In order to synthesize precursors of formula (I) with different chain lengths, aldehyde telechelic polybutadiene 2 (ATPB) were first prepared by the controlled degradation of high molar mass cis-1,4-PB 1 by varying the epoxidation rate with mCPBA followed by the oxidative scission of epoxides with periodic acid.

To study the effect of the chain length, fives molar masses were focused between 5 000 and 19 000 g·mol$^{-1}$. Results are shown in Table 1.

The aldehyde functions can be easily observed on $^1$H NMR spectra with a signal at δ=9.77 ppm that allows to calculate molar masses (see FIG. 1A). Molar masses were also determined by SEC and the obtained values are very close to the theoretical like those calculated by NMR confirming the good control of the degradation.

TABLE 1

Chemical characteristics of the polymers synthesized

| Name | Mn th g·mol$^{-1}$ | Epoxydation rate (%) | Mn$_{NMR}$[1] g·mol$^{-1}$ | DP$_{NMR}$ | Mn$_{SEC}$[2] g·mol$^{-1}$ | Đ$_{SEC}$[2] | f (—OH)[3] PB-OH | f (-furan)[3] PB-furan |
|---|---|---|---|---|---|---|---|---|
| 5 kg/mol | 5 700 | 2.10 | 5 300 | 97 | 5 750 | 1.95 | 3.9 | 4.0 |
| 9 kg/mol | 9 200 | 1.20 | 8 800 | 160 | 12 000 | 1.64 | 4.0 | 4.0 |
| 13 kg/mol | 11 700 | 0.91 | 13 300 | 246 | 15 800 | 1.58 | 4.0 | 3.9 |
| 16 kg/mol | 16 500 | 0.63 | 16 000 | 296 | 20 000 | 1.85 | 4.0 | 3.9 |
| 19 kg/mol | 19 000 | 0.53 | 19 000 | 352 | 23 000 | 1.68 | 3.9 | 4.0 |

[1]Calculated by using the signal proton of the aldehyde at 9.77 ppm and the proton signal of the butadiene units at 5.38 ppm.
[2]Molar masses and dispersities were calculated on a SEC calibrated with polyisoprene standards.
[3]Functionality in hydroxy and furan group were calculated by NMR.

Figure 1B:
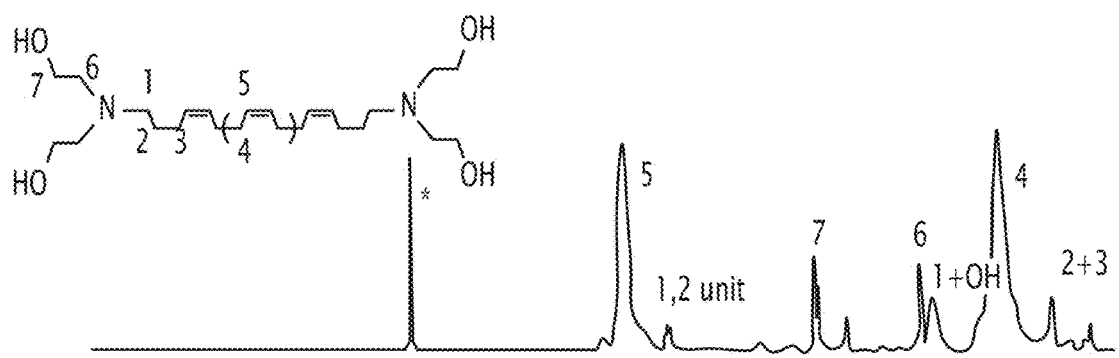
FIG. 1B: $^1$H NMR spectrum of the hydroxyl telechelic polybutadiene of formula (IV).

Hydroxy telechelic polybutadienes 3 were prepared by reductive amination of aldehydes group of ATPB 2 with an excess of diethanolamine (DEA) in the presence of NaBH (OAc)$_3$ to end up with an hydroxy functionality of 4. The $^1$H NMR analysis of the products showed the complete disappearance of the aldehyde signal (δ=9.77 ppm) and the appearance of a signal corresponding to the N—CH$_2$— at 2.7 ppm indicating a total conversion into amine (see FIG. 1B). It could be considered, due to the total conversion of the aldehydes, a theoretical hydroxy functionality of 4. The calculated functionality by the appearance of the new signal corresponding to the linked DEA at 2.80 and 3.72 ppm confirming the total conversion of the aldehyde (Table 1).

The furan-functionalized telechelic polybutadiene precursors 4 (PB-Fur$_4$) were synthesized from PB—OH$_4$ by reacting this latter with furan-NCO in the presence of dibutyltin dilaurate at 40° C.

Figure 1C:
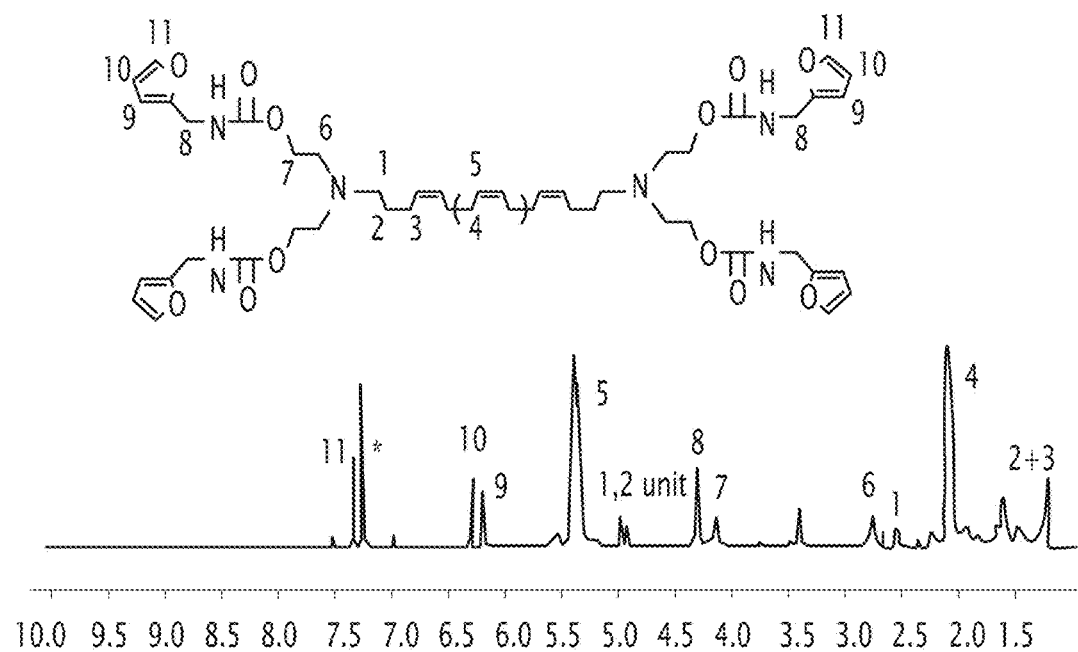
FIG. 1C: $^1$H NMR spectrum of the furan telechelic polybutadiene of formula (I) for the 5 000 g·mol$^{-1}$ series in CDCl$_3$.

The $^1$H NMR of the products showed all the expected signals corresponding to PB-Fur$_4$: shift of the HO—CH$_2$— from 3.72 ppm to 4.12 ppm (see FIG. 1C) and appearance of the furan signal —CH$_2$—NCO at 4.31 ppm allowed to confirm the full conversion of hydroxy groups into urethane functions. The calculated furan group functionality is very close to the one calculated at the PB—OH$_4$ step and is equal or near to 4 as shown in Table 1.

Figure 2:
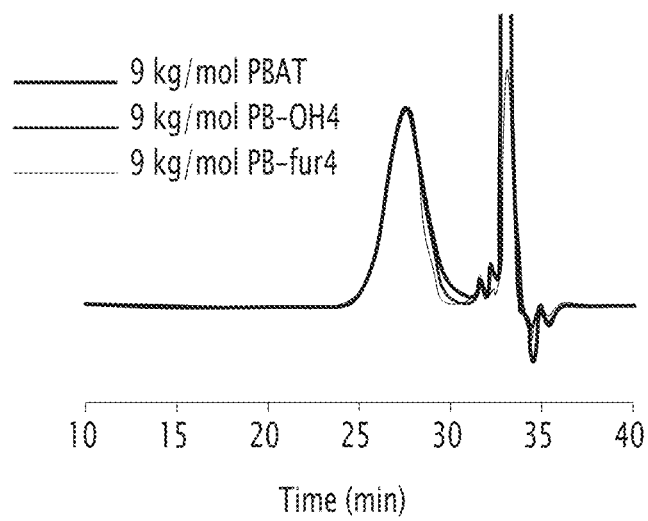
FIG. 2: SEC chromatograms of the synthetic intermediates for the 9 000 g·mol$^{-1}$ series: PBAT (aldehyde of formula (II)); PB—OH$_4$ (compound of formula (IV)); and PB-fur4 (precursor of formula (I)).

SEC analysis of the different samples has been performed and they confirmed the molar masses values calculated by NMR (Table 1). Besides, elution profiles of the 9 000 g·mol$^{-1}$ series for example show a superimposition of the different samples having different chain-ends (see FIG. 2) confirming that no side reactions (coupling and cross-linking) occurs during the chain-end modification steps.

Example 2: Preparation and Characterization of Polybutadiene Films, Polymers According to the Invention A—Materials and Methods 1. Preparation of Polybutadiene Films 1 g of PB-fur$_4$ 4 (1 g, DP-93, 796 µmol of furan) was dissolved in 1 mL of CHCl$_3$ and mixed with 0.5 eq of bis-maleimide (150 mg, 398 µmol) dissolved in 0.5 mL of CHCl$_3$. The mixture is heated at 60° C. for 10 min in a closed glassware and deposited in a Teflon mold. It is then waited 24 h for solvent evaporation and completely dryness was obtained under vacuum for an extra 24 h to obtain a transparent film without air bubbles.

2. Remolding of the Films

All the pieces of strips used for DMA and tensile tests analyses were put into a hermetic closed pressure resistant glassware (1 g in 1.5 mL of CHCl$_3$) and heated at 120° C. for 10 minutes. After 5 minutes at room temperature, the liquid solution is deposited in a Teflon mold before waiting for 24 h for solvent evaporation and it was completely dried under vacuum for 24 h to obtain a transparent film without air bubbles.

3. Characterization

Liquid-state $^1$H NMR and $^{13}$C NMR spectra were recorded at 298 K on a Bruker Avance 400 spectrometer operating at 400 MHz and 100 MHz respectively in appropriate deuterated solvents.

Polymer molar masses were determined by size exclusion chromatography (SEC) using tetrahydrofuran (THF) as the eluent (THF with 250 ppm of Butylated hydroxytoluene as inhibitor, Aldrich). Measurements in THF were performed on a Waters pump equipped with Waters RI detector and Wyatt Light Scattering detector. The separation is achieved on three Tosoh TSK gel columns (300×7.8 mm) G5000 HXL, G6000 HXL and a Multipore HXL with an exclusion limits from 500 to 40 000 000 g/mol, at flow rate of 1 mL/min. The injected volume was 100 µL. Columns' temperature was held at 40° C. Molar masses were evaluated with polyisoprene standards calibration. Data were processed with Astra software from Wyatt.

Thermo-gravimetric measurements (TGA) of polybutadiene polymer samples (≈12 mg) were performed on a TA Instruments Q500 from room temperature to 600° C. with a heating rate of 10° C.·min$^{-1}$. The analyses were investigated under nitrogen atmosphere with platinum pans.

Differential scanning calorimetry (DSC) measurements of polybutadiene polymer samples (≈10 mg) were performed using a DSC Q100 LN$_2$ apparatus from TA Instruments with a heating and cooling ramp of 10° C.·min$^{-1}$. The samples were first heated from 25° C. to 80° C. and held at 80° C. for 10 min in order to eliminate the residual solvent, then cooled to −150° C. and finally heated to 200° C. The analyses were carried out in a helium atmosphere with aluminum pans.

A TA Instrument RSA3 was used to study dynamic mechanical properties of polybutadiene polymer samples. The samples were analyzed under nitrogen atmosphere from −105° C. to 200° C. at a heating rate of 4° C.·min$^{-1}$. The measurements were performed in tensile mode at a frequency of 1 Hz, an initial static force of 0.1 N, and strain sweep of 0.3%.

Fourier transform infrared (FTIR) spectra were recorded on a Bruker VERTEX 70 instrument (4 cm$^{-1}$ resolution, 32 scans, DLaTGS MIR) equipped with a Pike GladiATR plate (diamond crystal) for attenuated total reflectance (ATR) at room temperature.

B—Results

1. Remolding of the Cross-Linked Polybutadiene Polymer of the Invention

Films were prepared by mixing the PB-Fur$_4$ dissolved in CHCl$_3$ with stoichiometric quantity of bis-maleimide. After evaporation of the solvent and drying under vacuum, transparent film without air bubbles were obtained (see FIG. 3). Strips with width of 5 mm, length of 25 mm and thickness between 0.4 and 0.7 mm were prepared by cutting the film for the different mechanical and thermo mechanical analysis.

Figure 3:
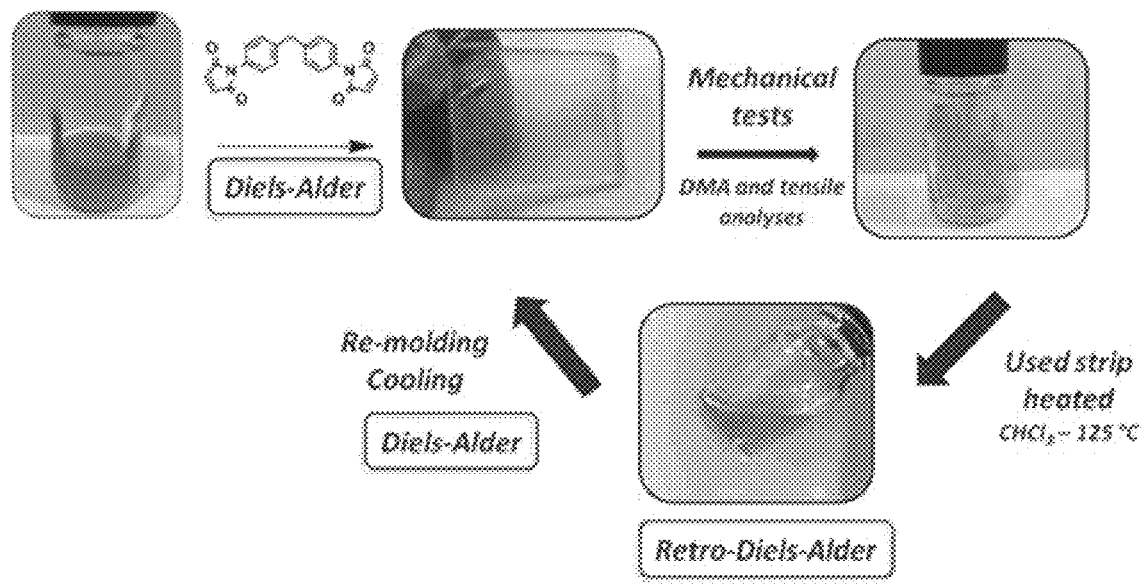
FIG. 3: Photo of a remolding cycle.

Dissolution tests of the reversible network formed after addition of bis-maleimide were thus carried out. FIG. 3 shows the efficient dissolution of the network obtained in chloroform. In FIG. 3, the film obtained after the first molding is represented on the second picture (from right to left); strips cut from the film and used for the DMA and tensile tests are on the third one; dissolution of the used and break strips in a closed glassware in chloroform at 120° C. are on the fourth picture; finally the new film formed from the used strips is the same as in the second picture.

2. Thermal Properties Analysis

Differential Scanning Calorimetry Analysis.

DSC analysis revealed an identical T$_g$ around −103° C. for each polymer samples regardless the chain length and the chain-end modification of the polybutadiene precursors.

Figure 4A:
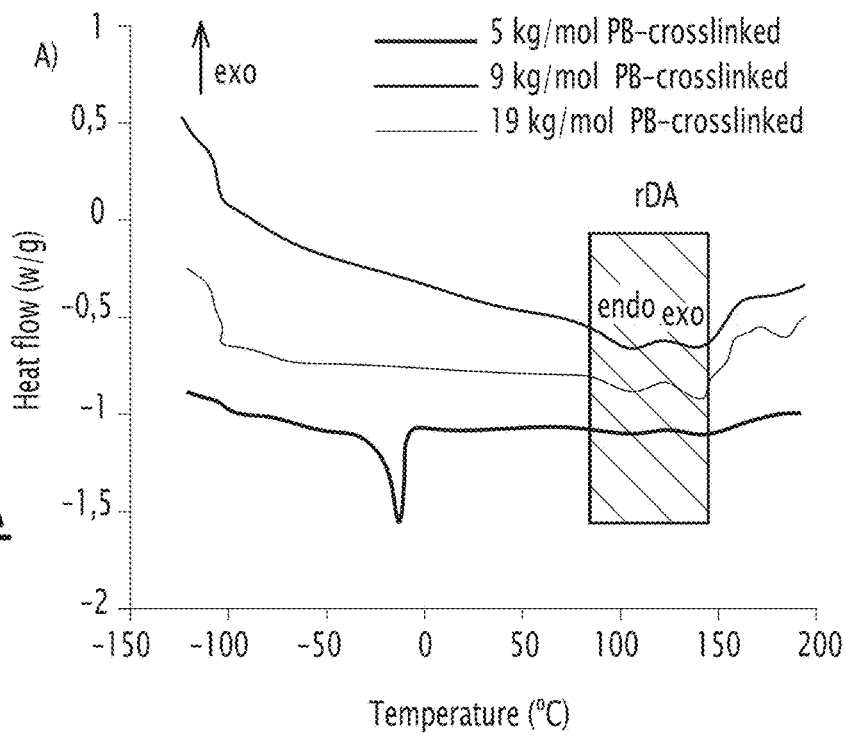
FIG. 4A: Normalized DSC curves comparison of the cross-linked PB series. The two endothermic peaks at 110° C. and 140° C. represent the retroDA of the exo and endo adducts respectively, exothermic peak at 160° C. represents the homopolymerisation of the bis-maleimide.

Comparison of the cross-linked PB with different chain length of the PB precursor is shown on FIG. 4A. Two endothermic peaks at 110 and 140° C. and one exothermic peak beginning at 160° C. were observed. Retro Diels-Alder reaction (rDA) is endothermic and exhibit two transitions: one for the endo-adduct and one for the exo-adduct. The exo-adduct, thermally more stable occurs at higher temperature as shown on the curves. Comparison of the 9 000 g·mol$^{-1}$ intermediates series indicate that the two endothermic peaks appear only when the polybutadiene is cross-linked confirming the occurrence of rDA reaction (see FIG. 4B).

Analyses of the recycled elastomer show the same results: the two endothermic peaks corresponding to the rDA occur at the same temperature for the first molding and the recycled one. This information indicates that the thermal transitions are not affected by the re-molding of the polymer of the invention.

Crystallization and melting points of the cis-1,4-polybutadiene are known to be around −40° C. and −10° C. respectively.

Figure 4B:
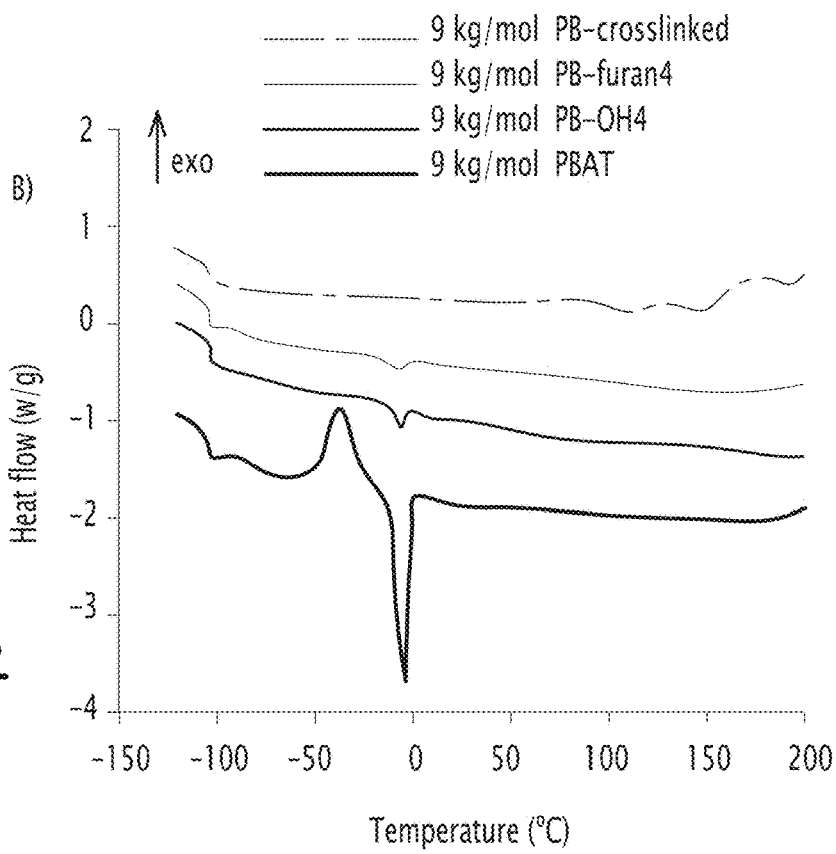
FIG. 4B: Normalized DSC curves comparison of the 9 000 g·mol$^{-1}$ modification series showing the melting peak decreases at −8° C. with the chain-end modifications.

The aldehyde telechelic polybutadiene with chain length of 9 000 g·mol$^{-1}$ was able to crystallize like the hydroxy and furan homologues (FIG. 4B). However, the intensity of the melting peaks located at −8° C. decreases significantly at each step of the PB modifications until a complete disappearance for the crosslinked one. An increase of the steric hindrance of the chain-end could prevent the polymer to crystallize leading to a decrease of the melting peak intensity. Besides as shown in FIG. 4A, only the crosslinked elastomer with a PB precursor of 19 000 g·mol$^{-1}$ crystallizes. This phenomenon could be attributed to the incapacity for the shorter chain to crystallize due to the entanglement induced by the cross-linking.

Thermo Gravimetric Analysis.

Figure 5A:
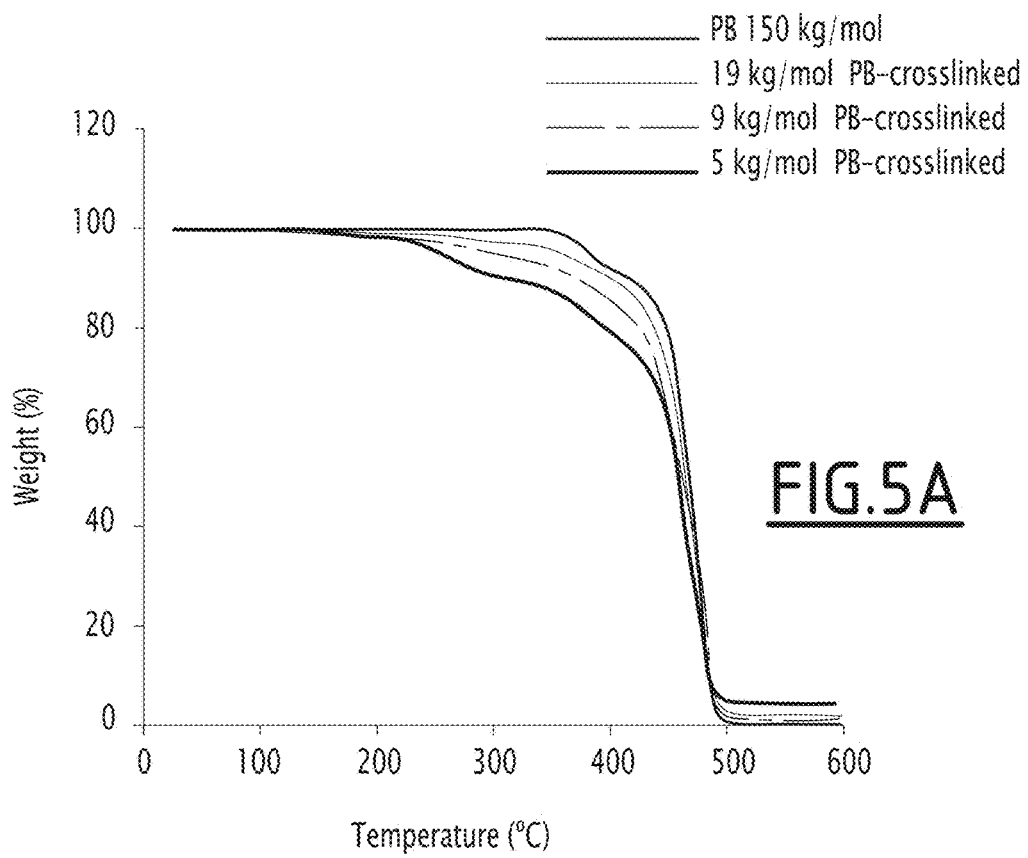
FIG. 5A: TGA curves comparison of the cross-linked PB series showing the increases loss mass at 300° C. due to the furan content.
Figure 5B:
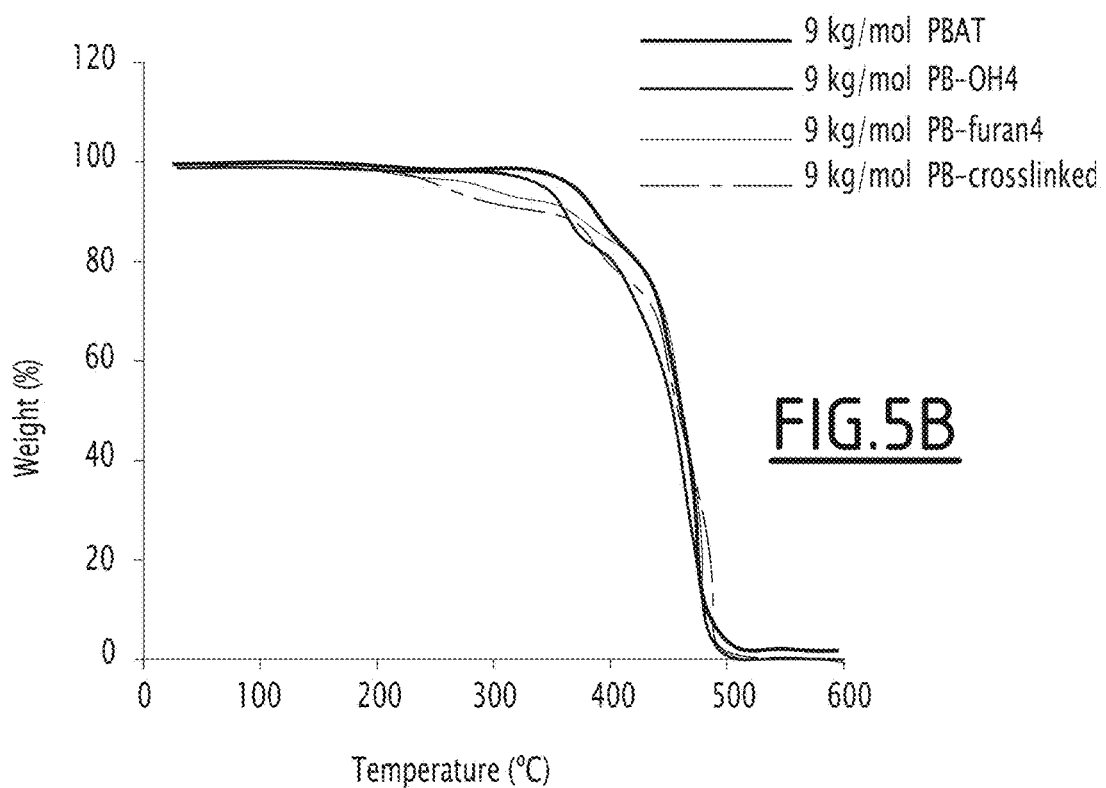
FIG. 5B: TGA curves comparison of the 9 000 g·mol$^{-1}$ modification series showing that the weight loss at 300° C. is related to the furan presence.

When all the crosslinked PB (polymers of the invention) are analyzed by TGA, higher weight loss is observed at 300° C. for lower chain length. The 150 kg·mol$^{-1}$ PB exhibited a loss of 0.5% whereas the loss for the 19, 9 and 5 kg·mol$^{-1}$ polymer was equal to 3.5, 6.8 and 12.9% respectively (see FIG. 5A). This could be attributed to the degradation of the furan ring. Indeed, when the ratio butadiene units/furan decreases (shorter chain), the mass content of furan is higher explaining the bigger weight loss. To confirm the furan degradation involvement at 300° C., curves of 9 000 g·mol$^{-1}$ intermediate series were compared, the weight loss at 300° C. appear only at the PB-Fur$_4$ state with an equivalent weight loss than crosslinked (see FIG. 5B).

Dynamic Mechanical Analysis.

Figure 6A:
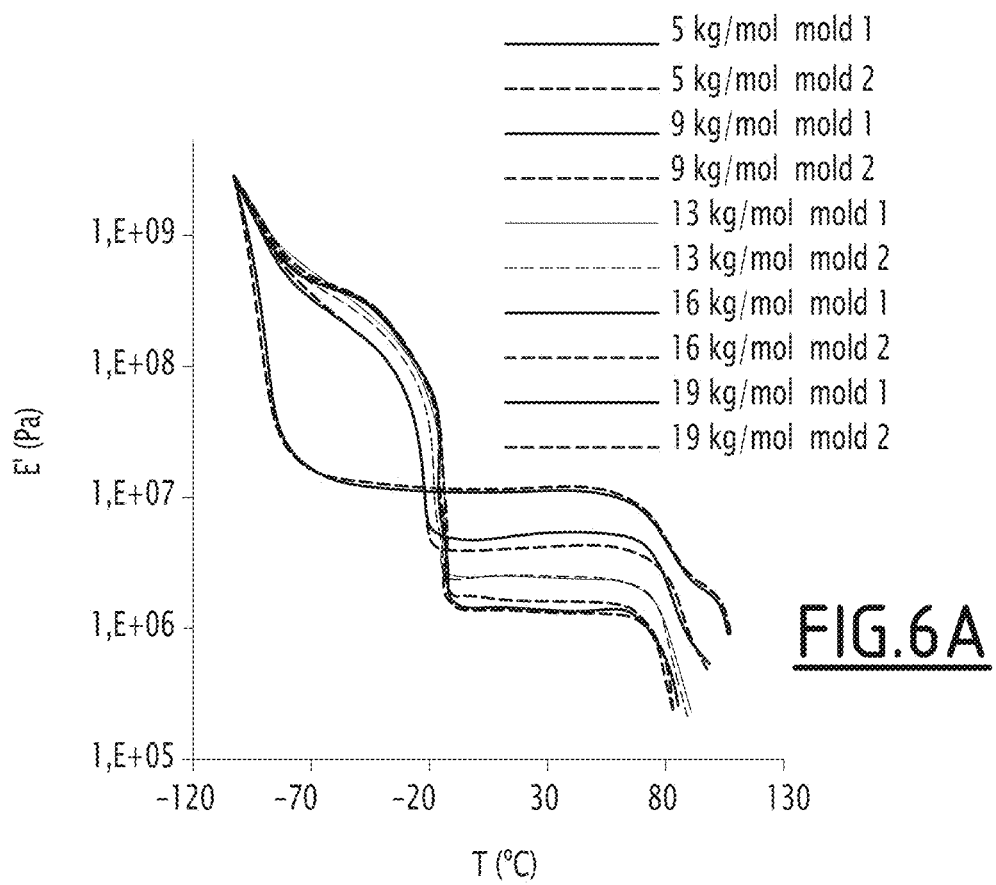
FIG. 6A: DMTA analysis of the cross-linked PB, effect of the chain length on the rubbery plateau (E').
Figure 6B:
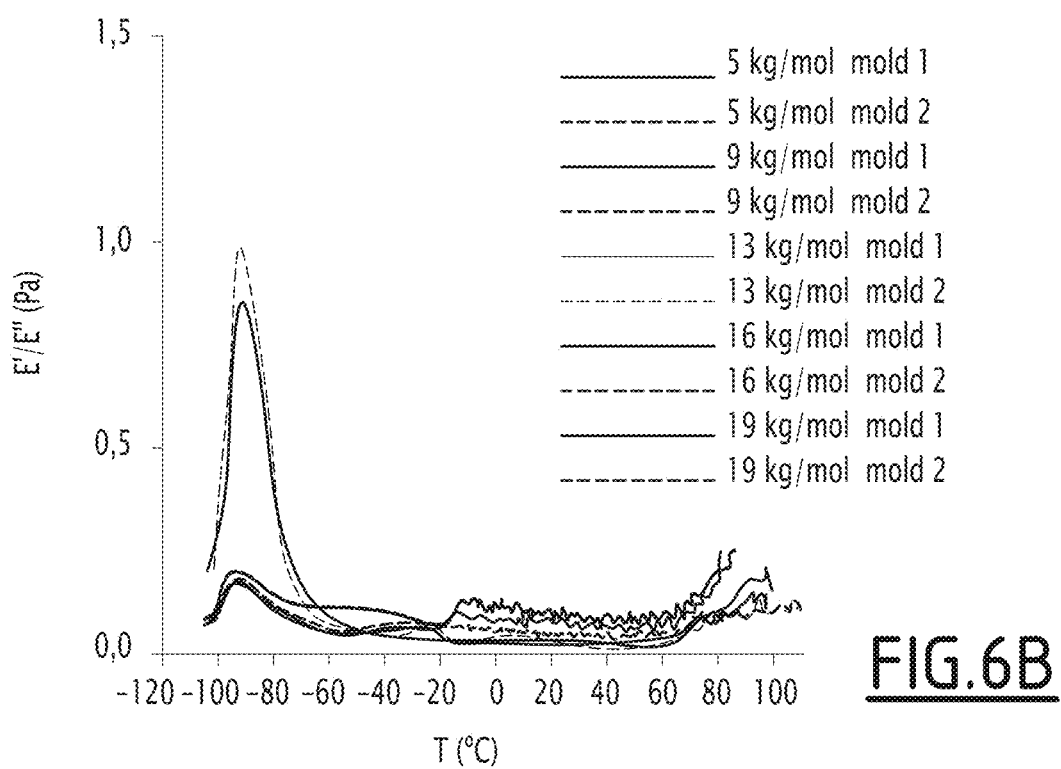
FIG. 6B: DMTA analysis of the cross-linked PB, effect of the chain length on the lost modulus (δ).

DMA analysis was further applied in tensile mode in order to measure the properties of the crosslinked PB (polymers of the invention). In FIGS. 6A and 6B, solid lines represent the first molding of the polymer whereas the dash lines are the recycled ones. Moduli of the samples were measured during the heating ramp (4° C./min) between −105 to 100° C. after a controlled cooling ramp (4° C./min) from room temperature to −105° C.

The storage modulus (E) shows a relation between the chain length of the PB precursor and the value of the rubbery plateau (see FIG. 6A, (1), solid lines). The higher values of E' were obtained for the shorter chain. For instance, the modulus at 25° C. increased from 1.4 MPa to 11.4 MPa for chain of 19 kg·mol$^{-1}$ and 5 kg·mol$^{-1}$ respectively. The higher cross-linking density in the shorter chain makes the material harder and improves the value of the rubbery plateau.

At higher temperature, curves indicate that all of the polymers start to lose their elastic properties at 80° C. This properties drop is actually due to the rDA and not to the melting of the chain. Indeed, it is known that the melting of a non-crosslinked elastomer is dependent on the chain length, which is not the case of the present invention. Moreover, in the literature it is mentioned that rDA started to occur at 90-100° C. depending on the system. The observation of property loses at 70-80° C. in DMA analysis is thus due to the tensile mode who adds an additional strength promoting the rDA.

Loss factor (Tan δ) curves shows, like in DSC analysis an identical $T_g$ around −90° C. regardless the chain length (FIG. 6B).

Recyclability of the polymer was then evaluated. Used strips from the different mechanical analyses were re-dissolved to make a new molding as explained above. DMA results were reported in dash line on FIGS. 6A and 6B. It can be noticed that the second molding does not affect the mechanical properties of the cross-linked materials. Indeed, curves from the first and second molding overlap perfectly showing the excellent recyclability of the elastomer. Finally, as observed previously in DSC analysis, only the longest chain crystallized in DMA.

Tensile Test

Tensile tests were performed to study the chain length effect on the mechanical properties. On FIG. 7, the median stress-strain curves of the cross-linked PB after the first molding (solid lines) and remolding (dash lines) can be observed. The tensile strength, the young's modulus and the elongation at break were determined and averaged over four measurements. Results are summarized in Table 2.

TABLE 2

Mechanical properties of the PB in function of the chain length.

| | Cycle | Young modulus (MPa) | Stress at break (MPa) | Strain at break (%) | Elastic modulus at 25° C. (MPa) |
|---|---|---|---|---|---|
| 5 kg/mol | First | 9.64 ± 0.67 | 4.8 ± 0.7 | 130 ± 19 | 11.40 |
| | Second | 9.58 ± 1.40 | 4.6 ± 0.4 | 126 ± 18 | 12.20 |
| 9 kg/mol | First | 3.50 ± 0.40 | 2.8 ± 0.5 | 160 ± 31 | 5.20 |
| | Second | 3.06 ± 0.15 | 2.9 ± 0.3 | 170 ± 19 | 4.01 |
| 13 kg/mol | First | 1.41 ± 0.04 | 2.3 ± 0.3 | 337 ± 15 | 2.42 |
| | Second | 1.34 ± 0.04 | 2.7 ± 0.1 | 398 ± 15 | 2.46 |
| 16 kg/mol | First | 0.98 ± 0.05 | 2.3 ± 0.2 | 421 ± 48 | 1.62 |
| | Second | 0.96 ± 0.11 | 1.4 ± 0.2 | 380 ± 40 | 1.56 |
| 19 kg/mol | First | 0.76 ± 0.16 | 1.7 ± 0.3 | 450 ± 75 | 1.39 |
| | Second | 0.84 ± 0.09 | 1.6 ± 0.3 | 375 ± 14 | 1.33 |

Figure 7:
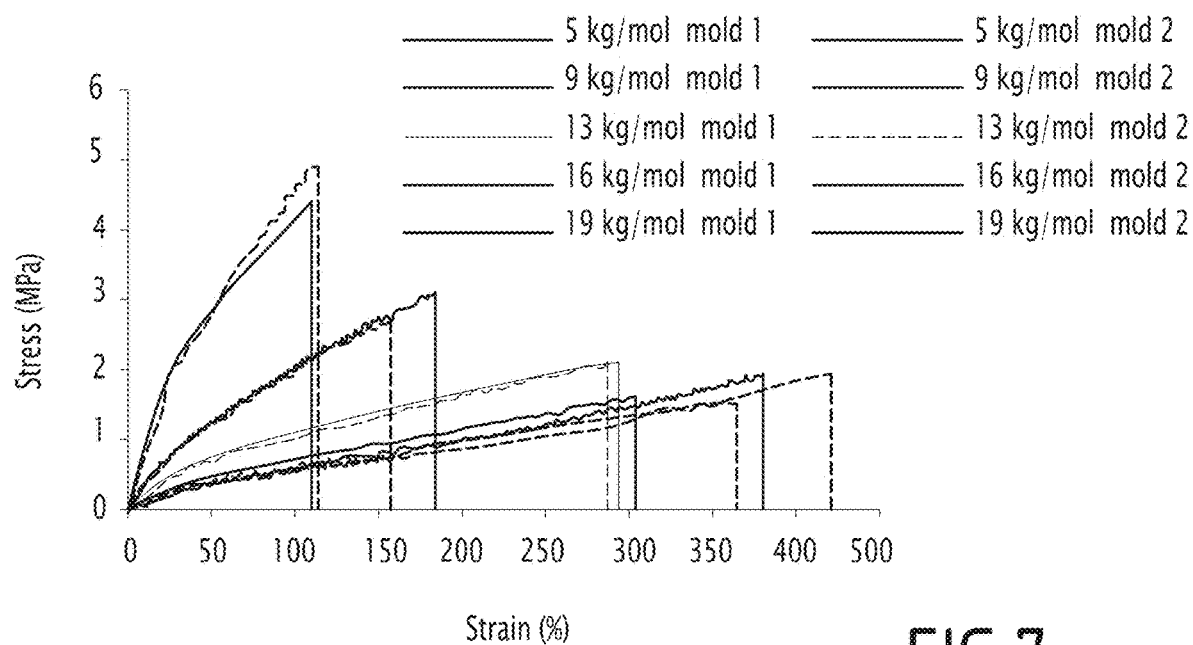
FIG. 7: Young's modulus comparison of the cross-linked PB between the first molding (solid lines) and the recycled ones (dashed lines).

Recyclability of the polymer was again tested in tensile mode (dashed lines see FIG. 7). An excellent reproducibility in term of young modulus, elongation and maximum stress at break was observed. These results are in agreement with the ones obtained in DMA showing the excellent recyclability of the polymer of the invention showing no mechanical properties loses after remolding.

Recyclability Properties of the Cross-Linked Polybutadiene

Figure 8:
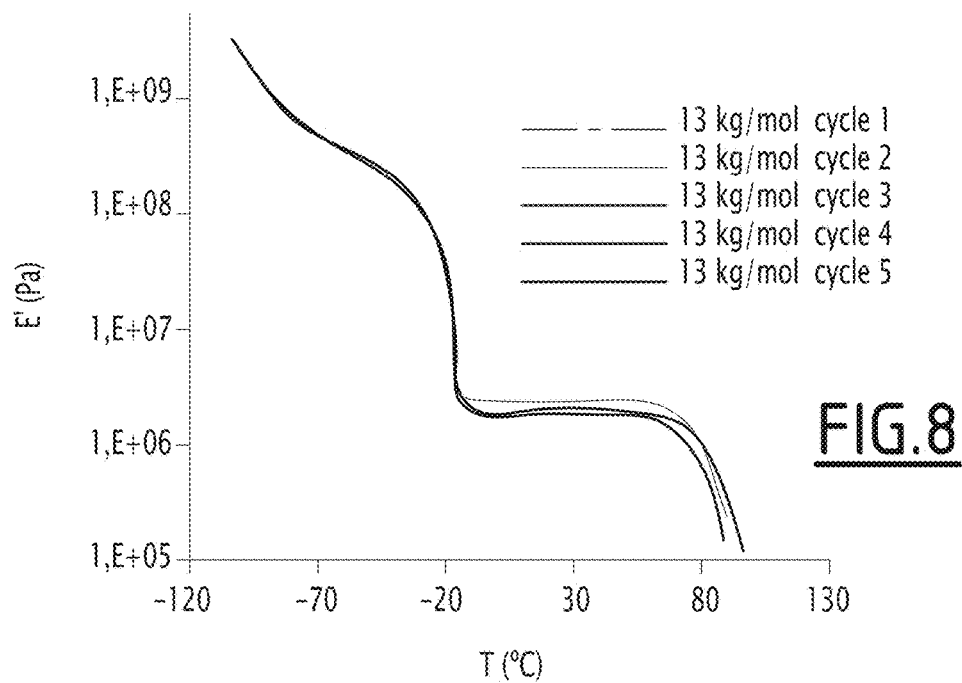
FIG. 8: DMA curves obtained after 5 reprocessing of the reversible cross-linked polybutadiene.

To go further in the investigation of the recyclability, the polybutadiene with a chain length of 13 000 g·mol$^{-1}$ was chosen to evaluate recyclability over 5 cycles. The process of remolding was the same as described previously. Curves of the elastic modulus obtained by DMA of the 5 cycles of the recycled polybutadiene were represented on FIG. 8. DMA analyses clearly show that the curves of each sample are nearly superimposed.

Figure 9:
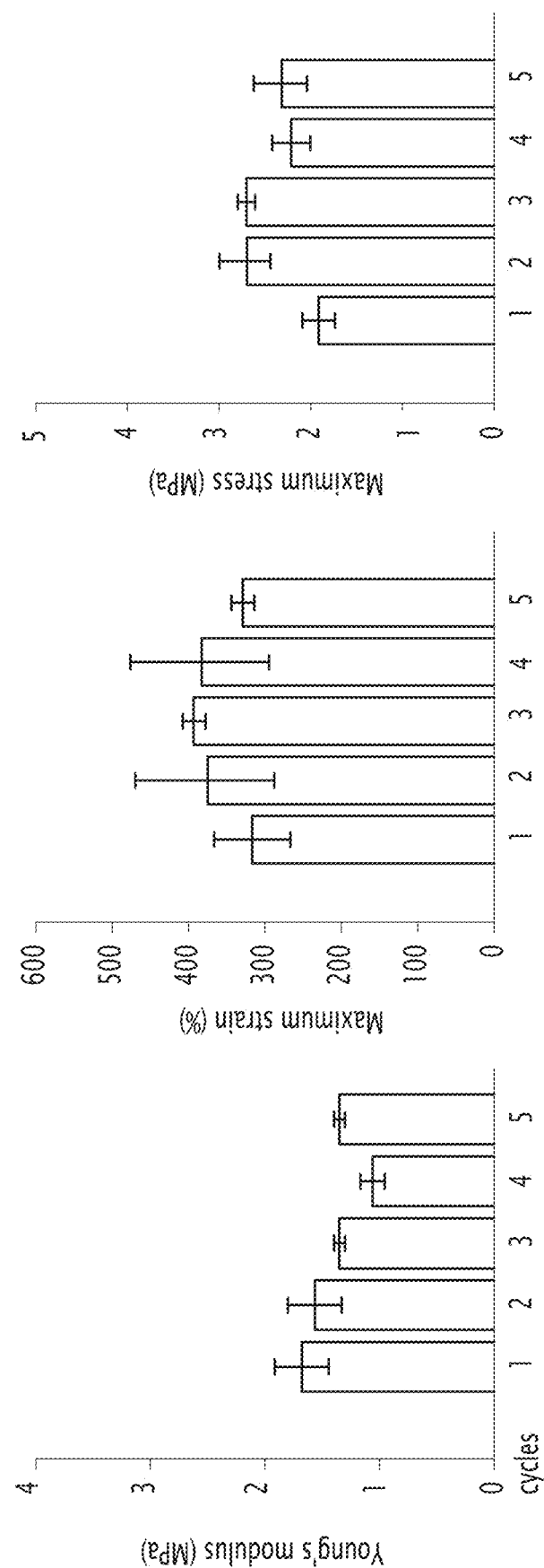
FIG. 9: Effect on the tensile test analysis after 5 reprocessing of the reversible cross-linked polybutadiene.

These results indicate that the value of the elastic plateau E', the Tg and the temperature of rDA are not affected by the remolding showing that the polymer of the invention is really stable after heating and stretching treatment. Tensile tests confirmed the results obtained by DMA (see FIG. 9). The values of young modulus, maximum stress and strain at break are not affected after 5 cycles of recyclability.

In conclusion, the obtained polymer when cross-linked has the properties of an elastomeric network whereas when heated, it becomes a liquid/viscous solution which can be remolded at least 5 times without properties loss.

Example 3: Effect of the Cross-Linking Agent Quantity on the Polymer of the Invention Properties (Polybutadiene Elastomer)

Figure 10:
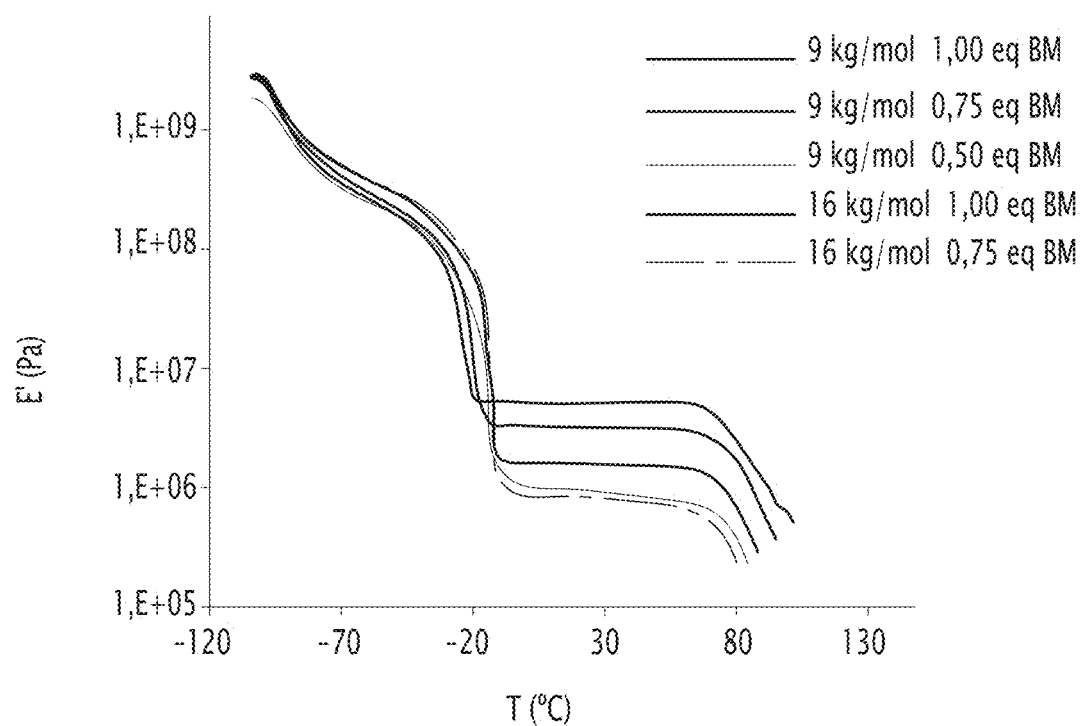
FIG. 10: Effect of the Bis-maleimide quantity on the mechanical properties of the network analyzed in DMA.

Samples with chain length of 9 000 and 16 000 g·mol$^{-1}$ were selected. The molar ratio of maleimide vs the furan groups were 1, 0.75 and 0.50 equivalents. DMA analysis (see FIG. 10) showed that the elastic modulus decreased with the cross-linking density. Indeed, the modulus E' is equal to 5.2, 3.2 and 0.8 MPa for a cross-linking density of 1, 0.75 and 0.50 respectively for the 9 000 g·mol$^{-1}$ series. Same behavior can be observed on the 16 000 g·mol$^{-1}$ series, the value of the elastic modulus decreased with the cross-linking density.

Figure 11:
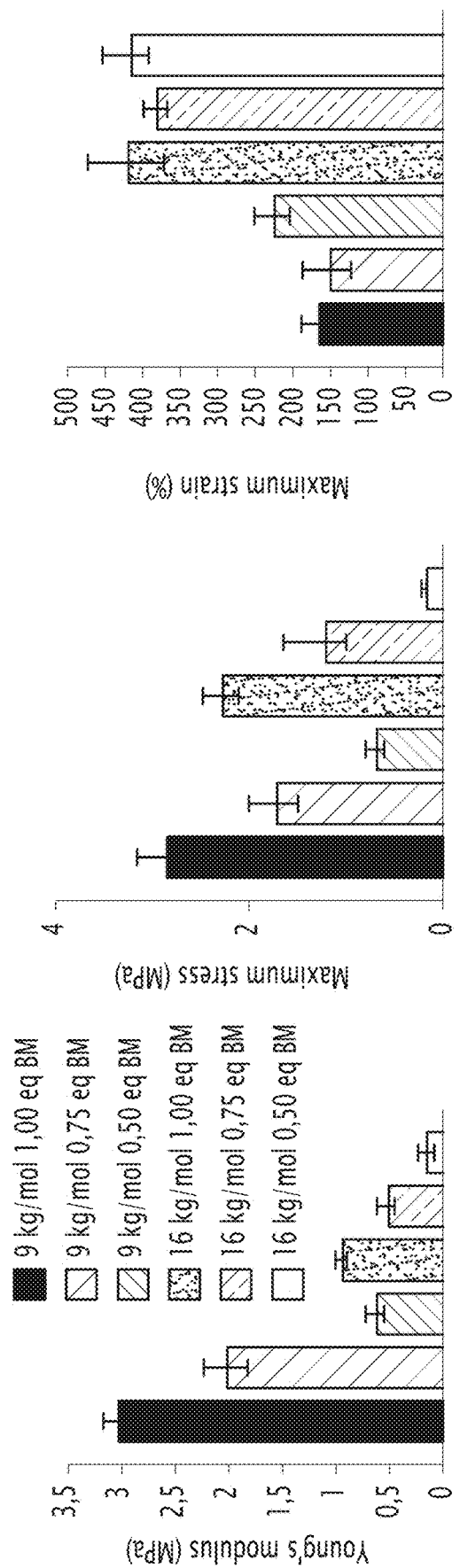
FIG. 11: Effect of the Bis-maleimide quantity on the mechanical properties of the network analyzed in tensile test.

Tensile tests were also carried out. Similar trends than for DMA were observed. Young's modulus for the 9 000 g·mol$^{-1}$ series went from 3.1 to 0.6 MPa and the maximum stress at break went from 2.9 and 0.7 MPa with a cross-linking density going from 1 to 0.50. Comparable results were obtained on the series of 16 000 g·mol$^{-1}$ (see FIG. 11).

Surprisingly, strain at break is not affected by the cross-linking density; it is seems to be only affected by the chain length as mentioned above. Indeed, strain at break is around 180% and 400% for the series of 9 000 and 16 000 g·mol$^{-1}$ respectively whatever the cross-linking density.

Example 4: Synthesis of Precursors of Formula (I) According to the Invention The compound 4', corresponding to a precursor of formula (I) of the invention, is prepared according to the following scheme 2:

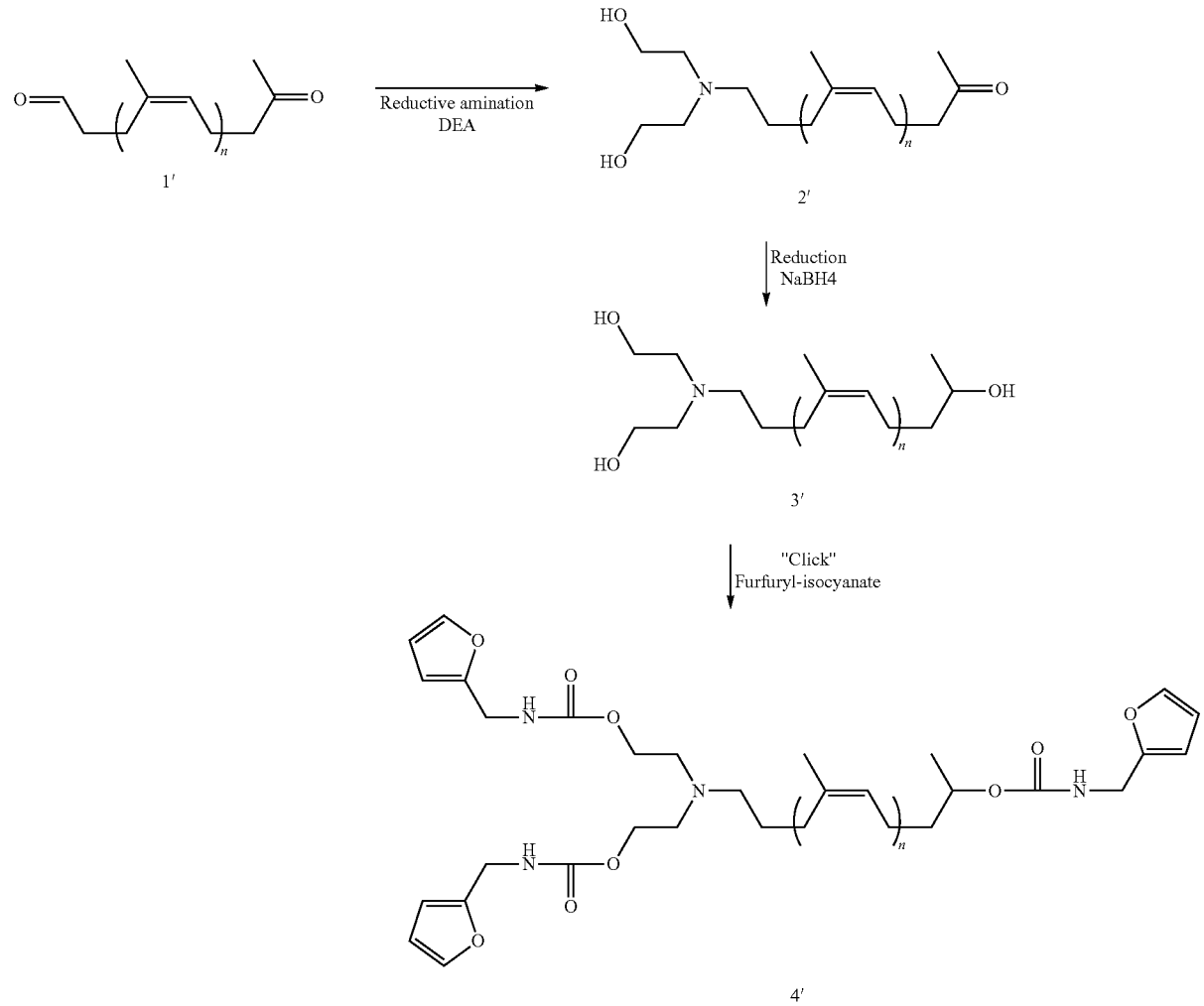

Scheme 2

High molar mass cis-1,4-polyisoprene (5.42 g) was first epoxidized with mCPBA (1.63 mmol) dissolved in 10 mL of THF in 190 mL of THF at 0° C. After 2 h of reaction at room temperature, periodic acid (1.05 eq. compared to mCPBA, 1.71 mmol) dissolved in 10 mL of THF were added dropwise and stirred during 2 h at room temperature. The solvent was then removed under reduced pressure and the crude product was dissolved in diethyl ether before filtration on celite to removed insoluble iodic acid. The filtrate was then concentrated before washing 2 times with saturated solution (30 mL of each) of $Na_2S_2O_3$, $NaHCO_3$ and distilled water. Finally, the organic layer was dried ($MgSO_4$), filtered on celite and the solvent was evaporated to dryness to obtain 1'. $M_{n\ (NMR)}$=500 g·mol$^{-1}$.

1' (3.50 g) dissolved in 14 mL of dry THF and 3 eq of DEA (234 mg) were mixed and stirred at 40° C. during 2 h under inert atmosphere. 3 eq of NaBH(OAc)$_3$ (475 mg) and 1.2 molar eq of acetic acid were added to the solution and stirred at 40° C. overnight under inert atmosphere. After concentration, the product was purified by precipitation/dissolution in methanol/DCM several times and dried under vacuum to obtain 2'.

2' (1.23 g) was dissolved in 15 mL of dry THF. 50 mg NaBH$_4$ were added to the solution and stirred at 60° C. during 10 h under inert atmosphere. After concentration, the product was purified by precipitation/dissolution in methanol/DCM several times and dry in vacuum to obtain 3'.

3' (0.949 g) was dissolved in 10 mL of dry THF. 79 µl of furan-isocyanate and 18 µl of DBTDL were added to the solution and stirred at 60° C. during 10 h under inert atmosphere. After concentration, the product was purified by precipitation/dissolution in methanol/DCM several times and dry in vacuum to obtain 4'.

The invention claimed is:

1. A compound having the following formula (I):

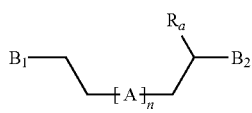
(I)

wherein:
n is an integer comprised between 10 and 2,000;
R$_a$ is selected from the group consisting of: H, linear or branched (C$_1$-C$_5$)alkyl, and halogen atom;
A comprises at least one repeating unit (U) having the formula (U1) or (U2):

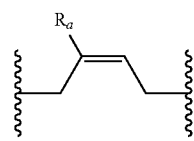
(U1)

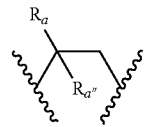
(U2)

with R$_a$ being as defined above and R$_{a''}$ being selected from the group consisting of H, —CH=CH$_2$, and —C(=CH$_2$)(R$_a$), R$_a$ being as defined above;
B$_1$ and B$_2$, independently of each other, have the following formula (B):

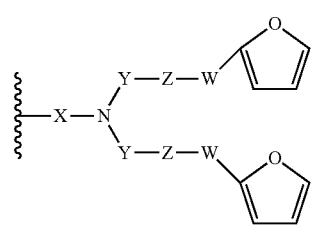
(B)

or the following formula (C):

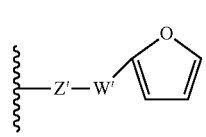
(C)

wherein at least one of B$_1$ and B$_2$ has the formula (B), wherein:
X is:
a bond or
a group of formula —NH—X$_1$—, wherein X$_1$ is a linear or branched (C$_1$-C$_5$)alkylene group;
Y is selected from the linear and branched (C$_1$-C$_5$) alkylene groups;
Z and Z' are independently of each other —O— or —NH—;
W and W' are independently of each other selected from the group consisting of: —C(=O)—NH—Y'—, —C(=O)—Y'—, and —Y'— groups, Y' representing a linear or branched (C$_1$-C$_5$)alkylene group.

2. The compound of claim 1, wherein the repeating unit (U) is of formula (U1):

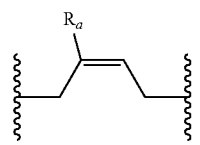
(U1)

Ra being as defined in claim 1.

3. The compound of claim 2, wherein A consists of repeating units (U).

4. The compound of claim 2, wherein R$_a$ is H or a (C$_1$-C$_5$)alkyl group.

5. The compound of claim 1, wherein A further comprises at least one repeating unit (V) having the following formula:

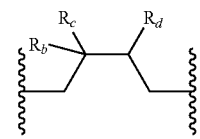
(V)

wherein:
R$_b$ is selected from the group consisting of: H, OH, (C$_1$-C$_5$)alkyl, and halogen atom;
R$_c$ is H or an halogen atom, or R$_b$ and R$_c$ form together with the carbon atom carrying them a —C=CH$_2$ group;
R$_d$ is selected from the group consisting of: H, OH, —S—C(=O)—R$_g$, —S—C(=S)—R$_g$, —P(=O)(OR$_g$)$_2$, —B(R$_g$)$_2$, furan-2,5-dionyl, and CX'$_2$R$_f$,
X' being a halogen atom,
R$_f$ being selected from the group consisting of halogen atom,
CH$_3$—C(=O)—O—(C$_1$-C$_{10}$)alkyl, —P(=O)(Hal)$_2$ with Hal being an halogen atom, R$_g$ being a linear or branched (C$_1$-C$_{10}$)alkyl group, or $R_c$ and $R_d$ form together with the carbon atoms carrying them a $(C_3-C_6)$cycloalkyl or a 3-6 membered heterocyclyl group;

the percentage of the number of repeating units (V) being inferior or equal to 50% of the number of repeating units (U).

6. The compound of claim 5, wherein the repeating units (V) are identical and are selected from the group consisting of:

(V1)
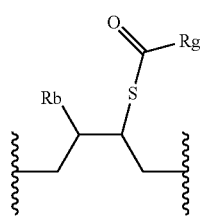

(V2)
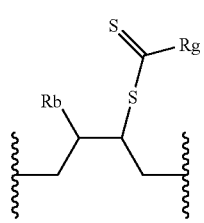

(V3)
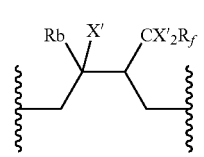

(V4)
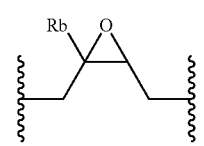

(V5)
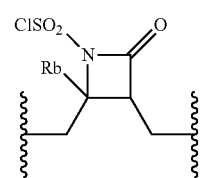

-continued (V6)
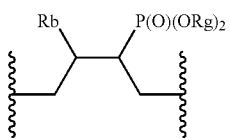

(V7)
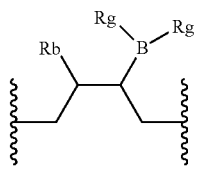

(V8)
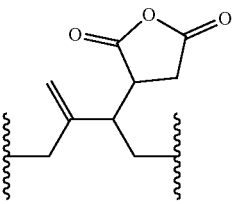

(V9)
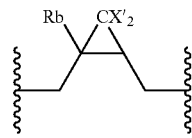

wherein $R_b$, X', $R_f$ and $R_g$ are as defined in claim 5.

7. The compound of claim 5, wherein the repeating units (V) are identical.

8. The compound of claim 1, wherein A consists of repeating units (U).

9. The compound of claim 1, having the following formula (Ia):

(Ia)
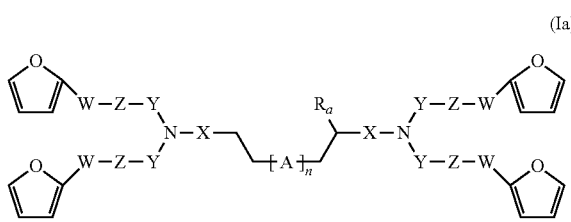

wherein n, $R_a$, A, X, Y, Z and W are as defined in claim 1.

10. The compound of claim 1, wherein $R_a$ is H or a $(C_1-C_5)$alkyl group.

11. The compound of claim 1, wherein Z is —O— and W is —C(=O)—NH—Y'—.

12. The compound of claim 1, having one of the following formulae:
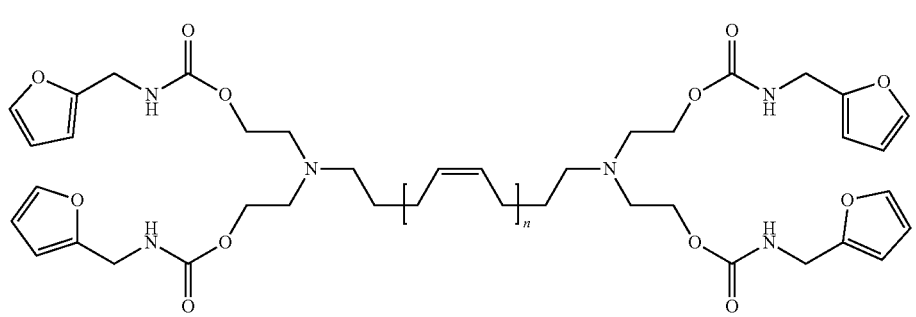
a
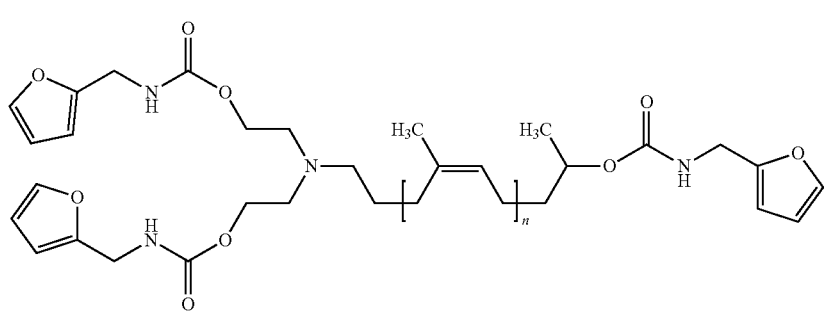
b
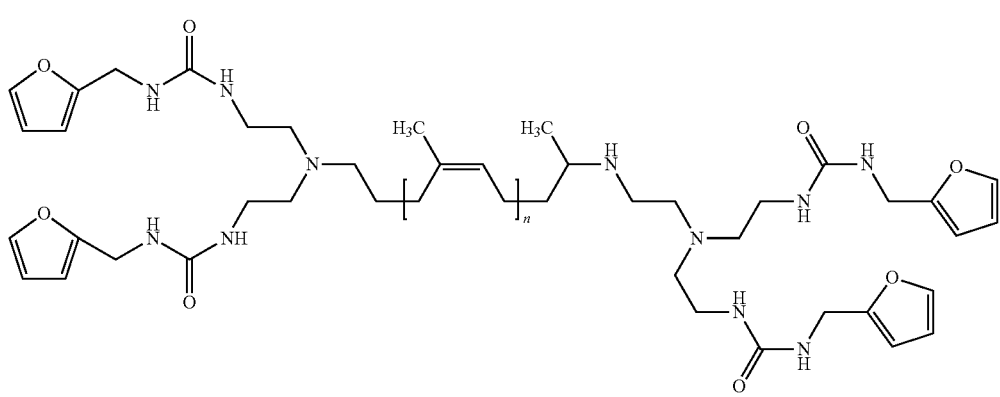
c
wherein n is as defined in claim 1.
13. A process for the preparation of a compound of formula (I) according to claim 1, comprising the following steps:
a) a reductive amination step comprising the reaction of an aldehyde of formula (II):
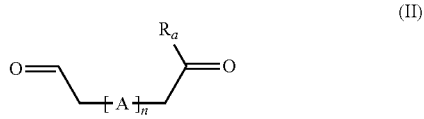
(II)
with at least one amine of formula (III):
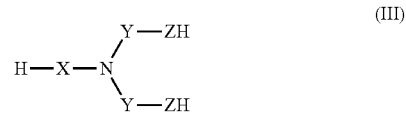
(III)

with n, $R_a$, A, X, Y, and Z being as defined in claim 1, in order to obtain a compound having the following formula (IV):

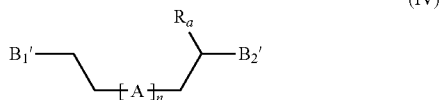

(IV)

with n, $R_a$ and A being as defined in claim 1, and wherein $B_1'$ and $B_2'$, independently of each other, have the formula (B'):

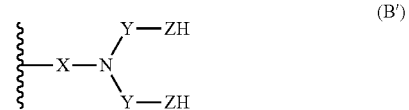

(B')

or form with the carbon atom carrying them a —C═O group,
and wherein at least one of $B_1'$ and $B_2'$ is of formula (B');
b) if one of $B_1'$ and $B_2'$ forms with the carbon atom carrying it a —C═O group, a reduction step comprising the reaction of the compound of formula (IV) as defined above with a reducing agent, in order to obtain a compound having the formula (IV'):

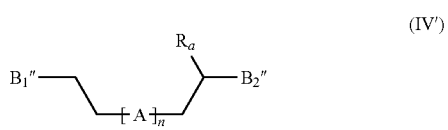

(IV')

with n, $R_a$ and A being as defined in claim 1, and wherein $B_1''$ and $B_2''$, independently of each other, have the formula (B'):

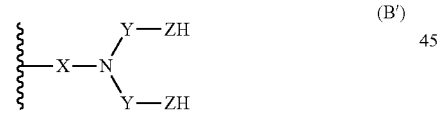

(B')

or —OH,
and wherein at least one of $B_1''$ and $B_2''$ is of formula (B');
c) the reaction of the compound of formula (IV) or (IV') with at least one functionalized furane having the following formula (VI):

(VI)

wherein W'' is independently chosen from the group consisting of: —Y'—N═C═O, —Y'—C(═O)—Cl, —Y'—C(═O)—OH, —Y'—C(═O), and —Y'-Hal, Y' being as defined in claim 1 and Hal being an halogen atom;
in order to obtain a compound having the formula (I).

14. A polymer, obtained by the reaction of a compound of formula (I) as defined in claim 1, with a crosslinking agent comprising at least two maleimidyl groups.

15. The polymer of claim 14, wherein the crosslinking agent has the following formula (VII):

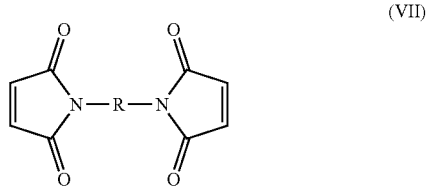

(VII)

wherein R is chosen from the group consisting of:
a linear or branched $(C_{1-20})$alkylene;
a phenylene; and
a phenylene-L-phenylene group, with L being selected from the group consisting of: a bond, $(C_1-C_6)$alkylene, —O— and —SO$_2$—.

16. The polymer of claim 14, wherein the polymer is an elastomer.

17. The polymer of claim 14, wherein the crosslinking agent has the following formula (VII):

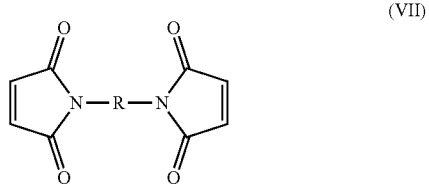

(VII)

wherein R is chosen from the group consisting of:
a linear or branched $(C_{1-20})$alkylene, said alkylene being interrupted by one or more heteroatom(s);
a phenylene, said phenylene being substituted by one or more substituent(s) selected from $(C_1-C_{10})$alkyl; and
a phenylene-L-phenylene group, with L being selected from the group consisting of: a bond, $(C_1-C_6)$alkylene, —O— and —SO$_2$—.

18. The compound of claim 1, wherein W and W' are independently of each other selected from the group consisting of: —C(═O)—NH—Y'—, —C(═O)—Y'—, and —Y'— groups, Y' representing a $(C_1-C_3)$alkylene group.

19. The compound of claim 1, wherein A further comprises at least one repeating unit (V) having the following formula:

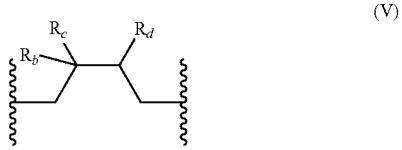

(V)

wherein:
$R_b$ is selected from the group consisting of: H, OH, $(C_1-C_5)$alkyl, and halogen atom;
$R_c$ is H or an halogen atom, or $R_b$ and $R_c$ form together with the carbon atom carrying them a —C═CH$_2$ group;

$R_d$ is selected from the group consisting of: H, OH, —S—C(=O)—$R_g$, —S—C(=S)—$R_g$, —P(=O)(O$R_g$)$_2$, —B($R_g$)$_2$, furan-2,5-dionyl, and C$X'_2R_f$, X' being a halogen atom, $R_f$ being selected from the group consisting of halogen atom, CH$_3$—C(=O)—O—(C$_1$-C$_{10}$)alkyl, —P(=O)(Hal)$_2$ with Hal being an halogen atom, $R_g$ being a linear or branched (C$_1$-C$_{10}$)alkyl group, or $R_c$ and $R_d$ form together with the carbon atoms carrying them a (C$_3$-C$_6$)cycloalkyl or a 3-6 membered heterocyclyl group, said cycloalkyl and heterocyclyl groups being substituted;

the percentage of the number of repeating units (V) being inferior or equal to 50% of the number of repeating units (U).

20. A compound having the following formula (IV):

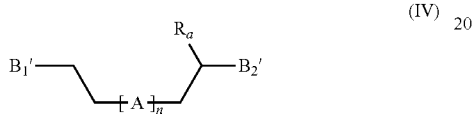

(IV)

wherein:

n is an integer comprised between 10 and 2,000;

$R_a$ is selected from the group consisting of: H, linear or branched (C$_1$-C$_5$)alkyl, and halogen atom;

A comprises at least one repeating unit (U) having the formula (U1) or (U2):

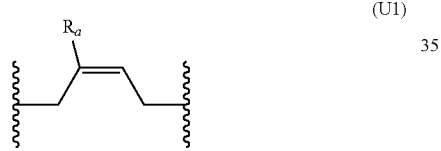

(U1)

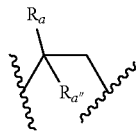

(U2)

with $R_a$ being as defined above and $R_{a''}$ being selected from the group consisting of H, —CH=CH$_2$, and —C(=CH$_2$)($R_a$), $R_a$ being as defined above;

$B_1'$ and $B_2'$, independently of each other, have the following formula (B'):

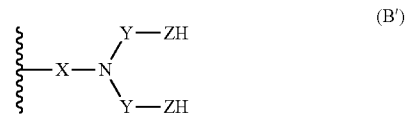

(B')

or form with the carbon atom carrying them a —C=O group, and wherein at least one of $B_1'$ and $B_2'$ is of formula (B');

wherein:

X is:

a bond or a group of formula —NH—X$_1$—, wherein X$_1$ is a linear or branched (C$_1$-C$_5$)alkylene group;

Y is selected from the linear and branched (C$_1$-C$_5$) alkylene groups;

Z is independently of each other —O— or —NH—.

\* \* \* \* \*